US010055483B2

(12) United States Patent
Lafuente Alvarez

(10) Patent No.: US 10,055,483 B2
(45) Date of Patent: Aug. 21, 2018

(54) DATA STREAM MANAGEMENT SYSTEMS

(75) Inventor: Luis Maria Lafuente Alvarez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 409 days.

(21) Appl. No.: 14/375,845

(22) PCT Filed: Mar. 8, 2012

(86) PCT No.: PCT/EP2012/053984
§ 371 (c)(1),
(2), (4) Date: Jul. 31, 2014

(87) PCT Pub. No.: WO2013/131570
PCT Pub. Date: Sep. 12, 2013

(65) Prior Publication Data
US 2014/0379712 A1    Dec. 25, 2014

(51) Int. Cl.
    *G06F 17/30* (2006.01)
(52) U.S. Cl.
    CPC .. *G06F 17/30657* (2013.01); *G06F 17/30457* (2013.01); *G06F 17/30516* (2013.01); *G06F 17/30699* (2013.01); *G06F 17/30705* (2013.01)
(58) Field of Classification Search
    CPC ............. G06F 11/1076; G06F 11/0709; G06F 17/30312; G06F 8/20; G06F 17/30861
    See application file for complete search history.

(56) References Cited

U.S. PATENT DOCUMENTS

2009/0106214 A1\* 4/2009 Jain .................. G06F 17/30516
2010/0017380 A1   1/2010 Naibo et al.
(Continued)

OTHER PUBLICATIONS

Kenneth Salem et al.: "Optimization of Query Streams Using Semantic Prefetching", SIGMOD 2004 Proceedings of the ACM SIGMOD International Conference on Management Data. Paris, France; [Proceedings of the ACM SIGMOD International Conference on Management of Data], New York, NY: ACM, US, vol. 30, No. 4, Jun. 13, 2004 (Jun. 13, 2004), pp. 179-190, XP002633359, ISBN: 978-1-58113-859-7 Jun. 13-18, 2004 consisting of 12-pages.
(Continued)

*Primary Examiner* — Mariela Reyes
*Assistant Examiner* — Courtney Harmon
(74) *Attorney, Agent, or Firm* — Christopher & Weisberg, P.A.

(57) ABSTRACT

A method is carried out by a data stream management system suitable for executing continuous queries on input data streams. Primary continuous queries are executed by, or provisioned to be executed by, the data stream management system on one or more input data streams in order to produce one or more output data streams. In the method, at least one secondary continuous query is generated for execution on the data stream management system on one or more input data streams. The generated secondary continuous queries are different from the primary continuous queries, and the secondary continuous queries are generated based on the at least one primary continuous query. The generation of secondary continuous queries notably enables, when ad-hoc continuous queries are requested, to quickly start outputting data streams for these ad-hoc queries. Data stream management systems and computer programs are also disclosed.

13 Claims, 16 Drawing Sheets

(56) References Cited

U.S. PATENT DOCUMENTS

| | | | |
|---|---|---|---|
| 2011/0178775 A1* | 7/2011 | Schoning | G06F 11/28 702/190 |
| 2012/0078951 A1* | 3/2012 | Hsu | G06F 17/30445 707/769 |
| 2012/0166417 A1* | 6/2012 | Chandramouli | G06F 17/30463 707/713 |
| 2012/0197852 A1* | 8/2012 | Dutta | H04L 67/2804 707/692 |

OTHER PUBLICATIONS

Daniel J. Abadi et al.: "Aurora: a New Model and Architecture for Data Stream Management", The VLDB Journal The International Journal on Very Large Data Bases, vol. 12, No. 2, pp. 120-139, XP055009044, ISSN: 1066-8888, DOI: 10.1007/s00778-003-0095-z Aug. 1, 2003 (Aug. 1, 2003) consisting of 20-pages.

Shivnath Babu et al.: "Adaptive Caching for Continuous Queries", Data Engineering, 2005. ICDE 2005. Proceedings 21st International Conference on Tokyo, Japan Apr. 5-8, 2005, Piscataway, NJ, USA, IEEE, pp. 118-129, XP010788147, DOI: 10.1109/ICDE.2005.15 ISBN: 978-0-7695-2285-2 Apr. 5, 2005 (Apr. 5, 2005) consisting of 12-pages.

Yijian Bai et al.: 'RFID Data Processing with a Data Stream Query Language' Proceedings of the 23rd International Conference on Data Engineering, ICDE 2007, pp. 1184-1193 (Apr. 15-20, 2007) consisting of 10-pages.

Sharma Chakravarthy; Q. Jiang: 'Stream Data Processing: A Quality of Service Perspective, Modeling, Scheduling, Load Shedding, and Complex Event Processing', Advances in Database Systems, vol. 36, ISBN: 978-0-387-71002-02009, e-ISBN: 978-0-387-71003-7, DOI: 10.1007/978-0-387-71003-7, Springer (2009) (May 8, 2009) consisting of 340-pages.

International Search Report and Written Opinion dated Apr. 17, 2013 for International Application Serial No. PCT/EP2012/053984, International Filing Date: Mar. 8, 2012 consisting of 10-pages.

* cited by examiner

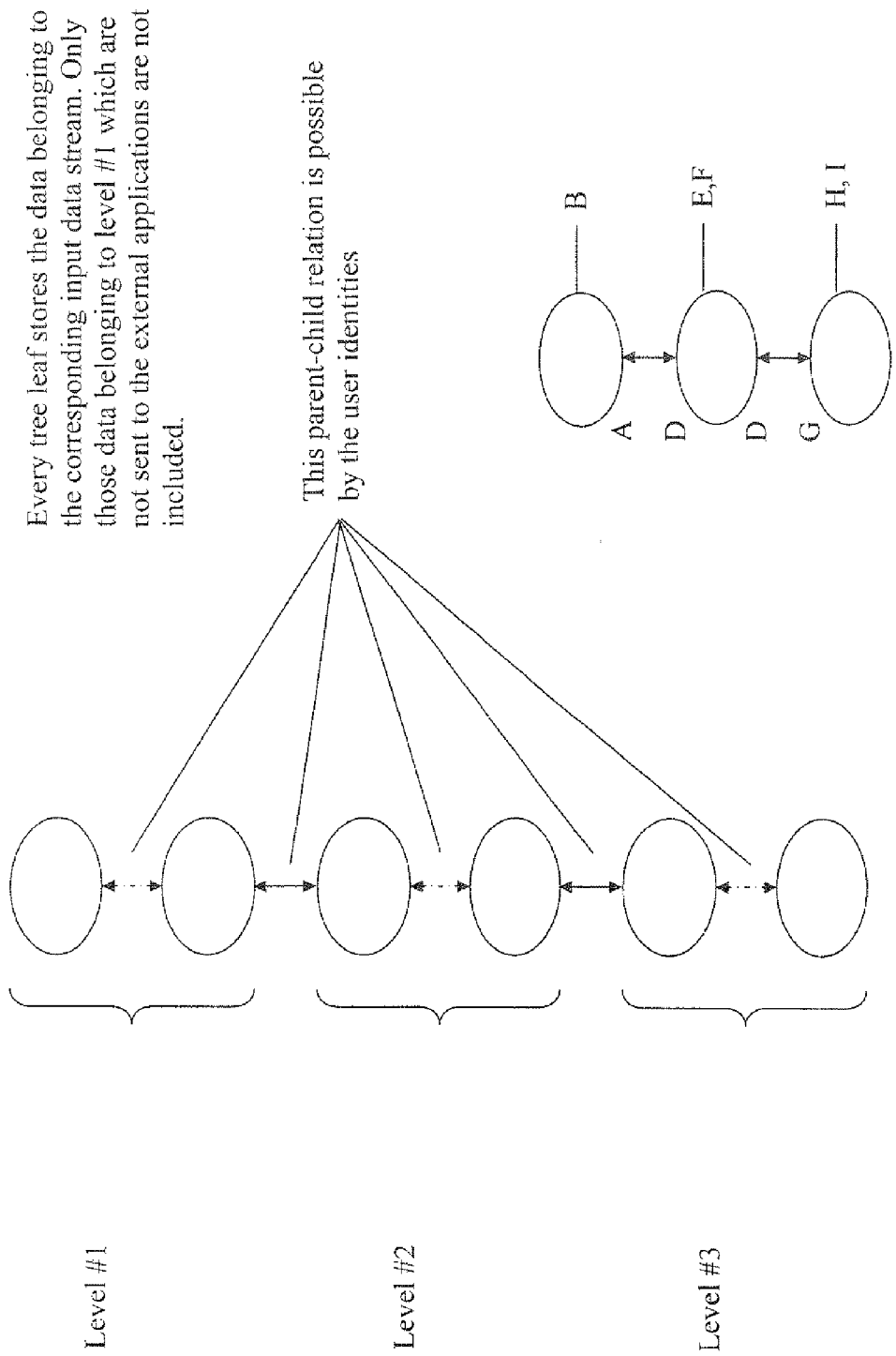

DATA STREAM MANAGEMENT SYSTEMS

TECHNICAL FIELD

The present invention relates to methods carried out by a data stream management system for executing continuous queries (CQs) on input data streams. The invention also relates to data stream management systems, and to computer program products and computer programs comprising computer-executable instructions configured, when executed on a computer, to cause the computer to carry out a method as mentioned above. The invention may notably be used in, although not limited to, the field of telecommunications, for processing data streams relating to the use of a telecommunication infrastructure.

BACKGROUND

In contrast to conventional database management systems (DBMS), against which a query is generally executed once and returns a set of results for a given point in time, a data stream management system (DSMS) enables the execution of continuous queries against data streams, thus reacting over time to continuous inputs from different sources. A data stream management system may for instance be implemented in the form of a computer program.

Some existing data stream management systems are disclosed for instance in D. J. Abadi, D. Carney, U. Çetintemel, M. Cherniack, C. Convey, S. Lee, M. Stonebraker, N. Tatbul, and S. Zdonik, *Aurora: A New Model and Architecture for Data Stream Management*, VLDB Journal, 12(2), August 2003 (here referred to as reference [1]) and in Y. Bai, F. Wang, P. Liu, C. Zaniolo, and S. Liu, *RFID Data Processing with a Data Stream Query Language*, Proceedings of the 23rd International Conference on Data Engineering, ICDE 2007, pp. 1184-1193, 2007 (here referred to as reference [2]).

It is desirable to improve existing data stream management systems, including their efficiency and usability in operation, i.e. when data streams are already being received. It is desirable to do so without increasing, or at least without excessively increasing, the implementation and architecture complexity and the associated equipment costs.

SUMMARY

To meet or at least partially meet the above-mentioned goals, methods, systems, computer programs and computer program products according to the invention are defined in the independent claims. Advantageous embodiments are defined in the dependent claims.

In one embodiment, a method is carried out by a data stream management system (DSMS) suitable for executing continuous queries on input data streams. At least one continuous query, here referred to as the at least one "primary continuous query", is executed by, or provisioned to be executed by, the DSMS on one or more input data streams to produce one or more output data streams. The method comprises a generating procedure for generating at least one additional continuous query, here referred to as the at least one "secondary continuous query", for execution on the DSMS on one or more input data streams. Each one of the at least one generated secondary continuous query is different from each one of the at least one primary continuous query. The at least one secondary continuous query is generated based on the at least one primary continuous query. In the following, continuous query is abbreviated as "CQ".

The method enables the generation of secondary CQs in anticipation of the later potential reception, by the DSMS, of a request from an external application to execute a CQ on the DSMS, where the requested CQ would match an existing secondary CQ. Thus, the method enables, thanks to the already existing secondary CQ, to immediately start, or at least quickly start, producing output data streams resulting from the execution of the requested CQ. This is particularly useful for CQs of which the execution requires the use of historical data, i.e. of which the execution depends on the past content of the data streams.

Executing a primary CQ on the DSMS involves the execution of the primary CQ against one or more input data streams to produce one or more output data streams. The input data streams come from external applications, such as—for example—nodes of a telecommunications network, remote sensor meters, etc, and the output data streams resulting from the execution of the primary CQs on the DSMS are sent to external applications for further processing, such as—for example—for raising an alarm, for modifying a communication parameter of a remote terminal, for sending a personalized advertising, etc.

Provisioning a primary CQ on the DSMS involves configuring the DSMS in preparation of executing the primary CQ. This may notably involve preparing connection points with persistent storage required for a later execution of the primary CQ. A connection point with persistent storage is a point in the data flow implemented in the DSMS to execute the CQs, wherein this point stores data items for a period of time. "In other words, as [data] items flow past a connection point, they are cached in a persistent store for some period of time" (reference [1], section 2.1, second paragraph). Preparing connection points with persistent storage required for a later execution of the primary CQ may for instance involve computing where the connection points should be set, which memory segments are to be used for implementing the persistent storage of the data items, and possibly already operating some of the connection points.

The secondary CQs are generated based on one or more existing primary CQs in the DSMS such as by altering elements of the primary CQs or combining the elements of different primary CQs in such a manner as to generate CQs that may potentially be later requested by external applications and by operators controlling such external applications. The generation procedure's aim is to guess, to predict or to anticipate which CQs will be requested and the generation procedure does so by altering the content of primary CQs to generate secondary CQs.

The secondary CQs are generated for execution on the DSMS against one or more input data streams, which means that the generated secondary CQs are capable of being executed on the DSMS. Generally, it is not useful to generate a secondary CQ which would make use of query operators not supported by the DSMS or which would be executed on hypothetical input streams, i.e. on input streams neither received nor expected to be received by the DSMS.

In one embodiment, once a secondary CQ is generated, it is directly executed on the DSMS. In another embodiment, the generated secondary CQ is not necessarily directly executed on the DSMS but may be provisioned on the DSMS for later execution. This is useful for instance if, at the point in time when the secondary CQ is generated, the available DSMS resources (e.g., memory and/or processing resources) do not allow the execution of the secondary CQ but nevertheless allow the provisioning thereof. Provisioning a CQ on a DSMS implies, as mentioned above in relation to primary CQs, configuring the DSMS in preparation of executing the CQ.

In a further embodiment, the generated secondary CQ is neither necessarily directly executed on the DSMS nor provisioned on the DSMS but the secondary CQ, including its syntax, may be stored for later provisioning and/or execution. This is useful for instance if, at the point in time when the secondary CQ is generated, the available DSMS resources neither allow executing nor provisioning the secondary CQ. Although neither immediately executed nor provisioned, the secondary CQ is stored and therefore ready to be provisioned and/or executed as soon as sufficient resources are available on the DSMS.

An executed secondary CQ differs from an executed primary CQ in that the output data stream(s) produced by an executed primary CQ are "sent outside", i.e. sent to external applications, whereas the output data stream(s) produced by an executed secondary CQ are not "sent outside", i.e. not sent to external applications. The output data stream(s) produced by an executed secondary CQ may be seen as being deleted once produced, i.e. drained from the DSMS.

In one embodiment, the generating procedure is executed at least following the reception, by the DSMS, of a request, from an external application, for executing, on the DSMS, one or more new primary CQs, and, in the generating procedure, generating the at least one secondary CQ is based on the one or more received new primary CQs. This embodiment enables to update the pool of secondary CQs taking into account the latest CQs requested by external applications.

In one embodiment, the method further comprises a selecting procedure comprising selecting, amongst the at least one secondary CQ, one or more preferred secondary CQs. The selection may take into account at least one of: (i) expected memory resources for executing, by the DSMS, the at least one secondary CQ; (ii) expected processing resources for executing, by the DSMS, the at least one secondary CQ; and (iii) likelihood that the at least one secondary CQ is requested by an external application. The preferred secondary CQ(s) may later be executed on the DSMS. This embodiment enables to prioritize, among the secondary CQs, the secondary CQs of which the execution is expected to lead to the highest probability of a later match between a newly requested CQ and one executed secondary CQ.

In one embodiment, the method further comprises determining that more resources than available are required for executing, on the DSMS, one or more CQs newly requested by external applications, and, as a result, interrupting the execution of one or more secondary CQs. The execution of an interrupted secondary CQ may later be resumed when: (a) determining that sufficient resources are available again for executing on the DSMS the interrupted secondary CQ, or (b) receiving, from an external application, a request for executing on the DSMS a CQ that matches the interrupted secondary CQ.

Resuming an interrupted CQ when condition (a) is satisfied enables an optimal use of the DSMS resources to maximize the probability of a later match between a newly requested CQ and one executed secondary CQ.

Resuming an interrupted CQ when condition (b) is satisfied is advantageous in that the data arrangements made within the DSMS for accomplishing the execution of a secondary CQ (e.g. in terms of information implementing the corresponding "query operators" and establishing logical links with the input data they have to process, etc) may already have been made although the secondary CQ is not currently executed (because the secondary CQ was interrupted as in the case where a secondary CQ has been generated but not prioritized for execution). Therefore, although the collection of some "state information" can delay the production of the corresponding output data stream(s) when a matching CQ is requested from an external application, the production of said output data stream(s) will be less delayed than if said arrangements had not been made at all beforehand by the DSMS (i.e. auto-generating the secondary CQs).

In one embodiment, the method further comprises, at the time when at least one secondary CQ is executed on the DSMS: receiving, from an external application, a request for executing on the DSMS a CQ; determining that the CQ for which a request for execution has been received matches a CQ already executed on the DSMS as a secondary CQ; and starting to send, to the external application from which the request has been received, and/or to any other external application, one or more output data streams resulting from the execution of said matching secondary CQ.

This enables the DSMS to send, to the external application(s), the output data stream(s) resulting from the requested CQ immediately after receiving the request for execution, even though the execution of the requested CQ and the production of results by the requested CQ require a certain amount of data items from the past (e.g. "state information"). Thanks to the secondary CQ generated by the DSMS on its own motion, it is as if, upon receiving a request to execute a CQ, the DSMS was able to go back in time to start the executing the requested CQ before it being requested.

In one embodiment, the generating procedure is implemented as follows. Let us consider:
(i) a first group of input data stream(s), here referred to as "first group input data stream(s)", comprising the input data stream(s) of which at least some data is used in a filtering condition in the at least one primary CQ;
(ii) a second group of input data stream(s), here referred to as "second group input data stream(s)", comprising the input data stream(s) of which no data is used in a filtering condition in the at least one primary CQ but of which at least some data is nevertheless used in the at least one primary CQ (this second group of input data stream(s) may be empty in some cases);
(iii) a third group of input data stream(s), here referred to as "third group input data stream(s)", comprising the input data stream(s) of which no data is used in the at least one primary CQ (this third group of input data stream(s) may be empty in some cases);
(iv) a first group of data component(s), here referred to as "first group data component(s)", comprising the data component(s) of the first group input data stream(s) which are used in a filtering condition and the data component(s) of said first group input data stream(s) which are included in one or more output data streams;
(v) a second group of data component(s), here referred to as "second group data component(s)", comprising, if the number of second group input data stream(s) is not zero (i.e., if the second group of input data stream(s) is not empty), data component(s) of said second group input data stream(s); and
(vi) a third group of data component(s), here referred to as "third group data component(s)", comprising, if the number of third group input data stream(s) is not zero (i.e., if the third group of input data stream(s) is not empty), data component(s) of said third group input data stream(s).

In this embodiment, the generating procedure comprises generating the at least one secondary CQ based on the at least one primary CQ by at least one of:
(a) combining a value of the first group data component(s) which has not been filtered out with second group data component(s) to generate a combination that is not used by any of the at least one primary CQ;
(b) repeating step (a) until all possibilities are exhausted;
(c) combining a value of the first group data component(s) which has been filtered out with second group data component(s) to generate a combination that is not used by any of the at least one primary CQ;
(d) repeating step (c) until all possibilities are exhausted;
(e) combining a value of the first group data component(s) which has not been filtered out with third group data component(s) to generate a combination that is not used by any of the at least one primary CQ;
(f) repeating step (e) until all possibilities are exhausted;
(g) combining a value of the first group data component(s) which has been filtered out with third group data component(s) to generate a combination that is not used by any of the at least one primary CQ; and
(h) repeating step (g) until all possibilities are exhausted.

If the second group of input data stream(s) is empty, operations (a), (b), (c), and (d) cannot be carried out. If the third group of input data stream(s) is empty, operations (e), (f), (g), and (h) cannot be carried out. It follows that, if both the second group of input data stream(s) and the third group of input data stream(s) are empty, no secondary CQ can be generated with this embodiment. Secondary CQs may however, in some embodiments, be generated through other ways of altering existing primary CQs, for instance based on CQs that were executed in the past on the DSMS.

In one embodiment, in the generating procedure, generating the at least one secondary CQ based on the at least one primary CQ comprises carrying out successively above-mentioned operations (a), (b), (c), (d), (e), (f), (g) and (h).

The invention also relates to a DSMS comprising at least one network node, wherein the DSMS is suitable for executing CQs against input data streams, and, wherein at least one CQ, here referred to as the at least one "primary CQ", is executed by, or provisioned to be executed by, the DSMS against one or more input data streams to produce one or more output data streams. The DSMS comprises a generating unit configured for generating at least one additional CQ, here referred to as the at least one "secondary CQ", for execution on the DSMS against one or more input data streams, wherein each one of the at least one generated secondary CQ is different from each one of the at least one primary CQ, and wherein the generating unit generates the at least one secondary CQ based on the at least one primary CQ.

The invention also relates to computer program products and computer programs comprising computer-executable instructions configured, when executed on a network node or a computer, to cause the network node or computer to carry out a method according to any one of the above-described embodiments.

BRIEF DESCRIPTION OF THE DRAWINGS

Embodiments of the present invention shall now be described, in conjunction with the appended figures, in which:

FIG. 4b is a flowchart of a method in one embodiment of the invention, which combines the embodiments of FIGS. 3 and 4a;

FIG. 5b is a flowchart of a method in one embodiment of the invention, which combines the embodiments of FIGS. 3 and 5a;

FIG. 6 is a flowchart of a method in one embodiment of the invention, which essentially combines the embodiments of FIGS. 4a and 5a;

FIG. 18 schematically illustrates a logical tree data structure built from input data streams, in one embodiment of the invention; and FIG. 19 shows an exemplary logical tree data structure resulting from applying, to the example of FIG. 17, a generating procedure in one embodiment of the invention.

DETAILED DESCRIPTION

The present invention shall now be described in conjunction with specific embodiments. These specific embodiments serve to provide the skilled person with a better understanding, but are not intended to in any way restrict the scope of the invention, which is defined by the appended claims.

Figure 1:
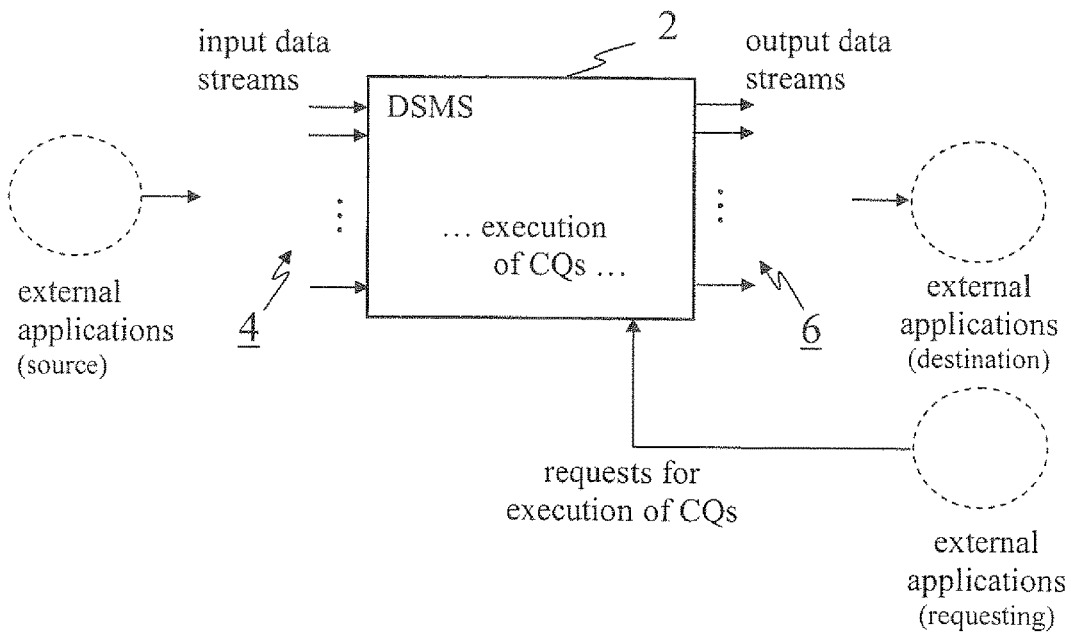
FIG. 1 schematically illustrates a DSMS usable in embodiments of the invention.

FIG. 1 schematically illustrates a DSMS 2 usable in embodiments of the invention.

DSMS 2 receives input data streams 4 transmitted from what is referred herein as external applications. These external applications may be called "source external applications" and may comprise entities outside the DSMS 2 such as: network nodes of a telecommunications system, servers executing computer programs producing data streams (streams of data items representing software events, for instance), remote sensor devices, etc. These source external applications (or, more precisely, the devices/servers hosting said source external applications) are not individually illustrated in FIG. 1, but collectively illustrated by the dashed circle on the left-hand side of FIG. 1. DSMS 2 executes CQs against the received input data streams 4 (as schematically illustrated by the words " . . . execution of CQs . . . " in the depicted box corresponding to DSMS 2). Further, DSMS 2 sends out output data streams 6 resulting from the CQ(s) execution to entities outside the DSMS 2 serving external applications. These destination external applications (or, more precisely, the devices/servers hosting said destination external applications) are not individually illustrated in FIG. 1, but collectively illustrated by the upper dashed circle on the right-hand side of FIG. 1. These destination external applications may be hosted by servers or devices external to the DSMS 2, which further process the received output data streams 6 to—for example—for raising an alarm, for modifying a communication parameter of a remote terminal, for sending a personalized advertising, etc. An output data stream 6 produced by a primary CQ is sent out to at least one external application, whereas an output data stream 6 produced by a secondary CQ is not sent to any external application. In other words, the output data stream(s) 6 produced by an executed secondary CQs are dropped and not used by any external application.

External applications may request the execution, by DSMS 2, of CQs against one or more input data streams 4. This is schematically illustrated on FIG. 1 by the arrow labelled "requests for execution of CQs" arriving at the depicted box corresponding to DSMS 2. These requesting external applications are not individually illustrated in FIG. 1, but they are collectively illustrated by the lower dashed circle on the right-hand side of FIG. 1.

Although FIG. 1 schematically illustrates a plurality of input data streams 4, a plurality of external applications, a plurality of output data streams 6, a plurality of executed CQs, and a plurality of requests for execution of CQs, the invention is not limited to any number of input data streams 4, external applications, output data streams 6, executed CQs, and received requests for execution of CQs. In particular, there may be, for instance at one point in time, a single input data stream, a single external application, a single output data stream 6, a single executed CQ, and/or a single received request for execution of CQs. The so-called source external applications, destination external applications, and requesting external applications may also constitute the same group of external applications, or partially the same group of external applications. In other words, there may some external applications being both source and destination external applications, there may some external applications being both source and requesting external applications, there may some external applications being both destination and requesting external applications, and there may some external applications being source, destination and requesting external applications.

Figure 2:
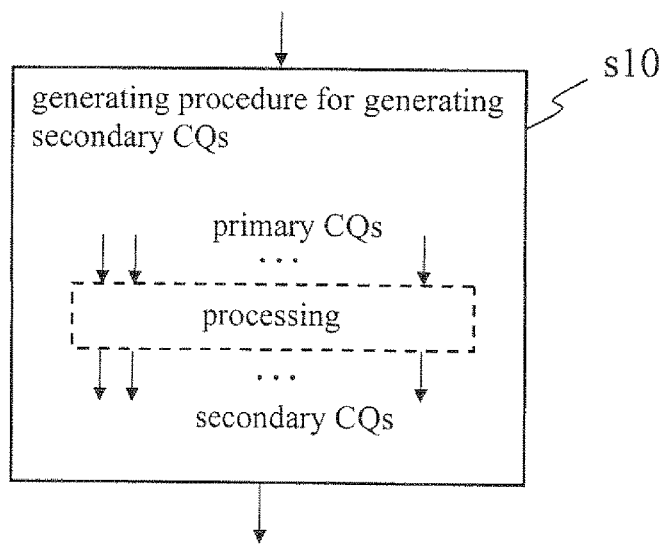
FIG. 2 is a flowchart of a method in one embodiment of the invention, the method being carried out by a DSMS.

FIG. 2 is a flowchart of a method in one embodiment of the invention. The method is carried out by a DSMS 2. At least one primary CQ is executed by, or provisioned to be executed by, DSMS 2 against one or more input data streams 4 to produce one or more output data streams 6 (not illustrated on FIG. 2). In parallel, DSMS 2 executes a generating procedure s10 for generating secondary CQs suitable for execution on DSMS 2 against one or more input data streams 4. These secondary CQ(s) are different from the primary CQ(s), and, as schematically illustrated by the dashed box labelled "processing", the secondary CQ(s) are based on, i.e. derived from, the primary CQ(s). DSMS 2 is configured to generate by itself, i.e. on its own motion, automatically and without intervention of a human at the time of generation, secondary CQ(s) and their corresponding query operators.

In the field of telecommunications, the term "provisioning" is commonly used to refer to the process of providing configuration data in one or more nodes for executing a certain service, or to adapt the execution of a certain service, according to said configuration data. In the present embodiment, a DSMS may initially be configured to execute one or more CQs (preconfigured CQ), and the DSMS may be "provisioned" later, i.e. by means of a message received by the DSMS from a certain application server or from an operation and maintenance (O&M) configuration manager, with information to execute an additional CQ (ad-hoc CQ).

Figure 3:
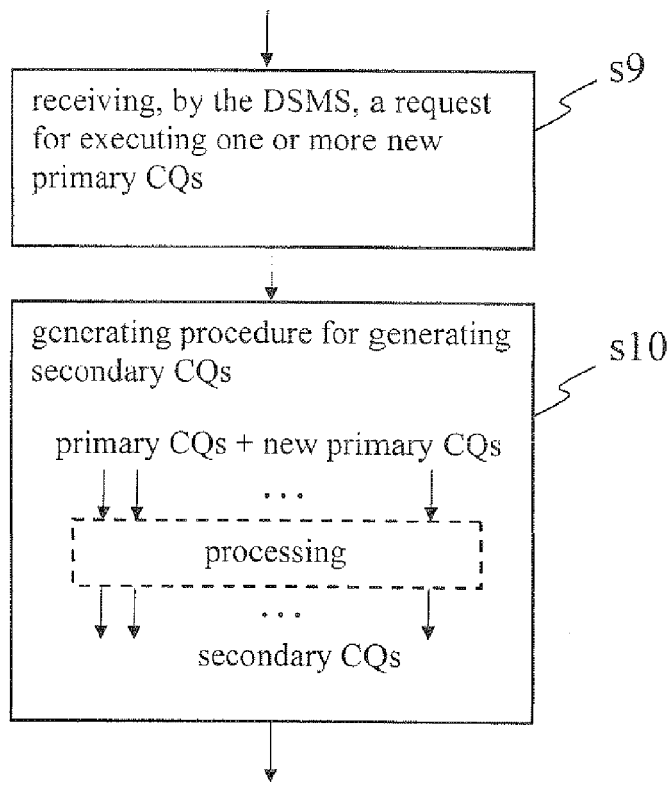
FIG. 3 is a flowchart of a method in one embodiment of the invention, wherein the generating procedure is carried out after receiving a request, from an external application, for executing new CQ(s)

FIG. 3 is a flowchart of a method in one embodiment of the invention. In addition to the generating procedure s10 already discussed with reference to FIG. 2, the method of FIG. 3 comprises a step s9 of receiving, by DSMS 2, a request, from an external application, for executing, on DSMS 2, one or more new primary CQs. Following step s9, generating procedure s10 is executed to generate secondary CQ(s) based on the newly received primary CQ(s) and the already existing primary CQ(s) (thus the words "primary CQs+ new primary CQs" in the box associated with generating procedure s10), or based on the newly received primary CQ(s) only.

Figure 4A:
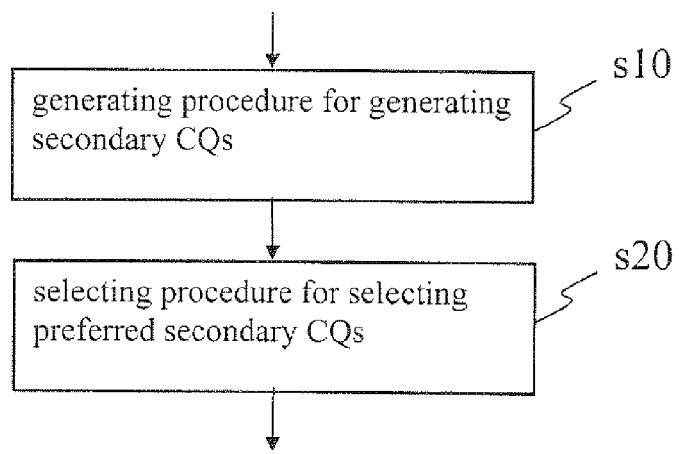
FIG. 4a is a flowchart of a method in one embodiment of the invention, wherein, after the generating procedure, a selecting procedure is executed for selecting, amongst generated secondary CQs, preferred secondary CQ(s)

FIG. 4a is a flowchart of a method in one embodiment of the invention, wherein, in addition to the generating procedure s10 already discussed with reference to FIG. 2, a selecting procedure s20 is depicted. Selecting procedure s20, executed after generating procedure s10, comprises selecting, amongst the generated secondary CQs, one or more preferred secondary CQs. The preferred secondary CQs are those which have priority when deciding which secondary CQs to execute on the DSMS 2.

Selecting procedure s20 may for instance take into account the expected memory resources required for executing, by DSMS 2, the individual secondary CQs (or sets of secondary CQs) and then assigning a higher priority to the secondary CQs expected to use less memory resources. Selecting procedure s20 may also for instance take into account the expected processing resources required for executing, by DSMS 2, the individual secondary CQs (or sets of secondary CQs) and then assigning a higher priority to the secondary CQs expected to use less processing resources. Further, the likelihood that the individual secondary CQs are requested by an external application may be estimated based on any method, such as by heuristic methods programmed on the DSMS 2.

Figure 4B:
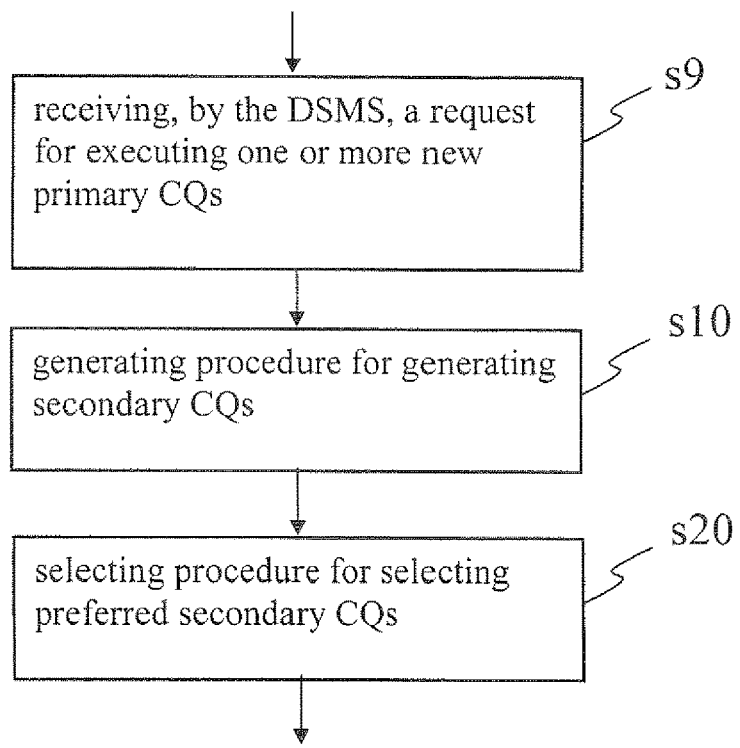

FIG. 4b is a flowchart of a method in one embodiment of the invention, which combines the embodiments illustrated with reference to FIGS. 3 and 4a. Namely, after receiving s9, by DSMS 2, a request, from an external application, for executing, on DSMS 2, one or more new primary CQs, generating procedure s10 is executed to generate secondary CQ(s) based at least on the newly received primary CQ(s), Then, selecting procedure s20 is executed to select, amongst the generated secondary CQs, one or more preferred secondary CQs, which have priority when deciding which secondary CQs to execute on the DSMS 2.

Figure 5A:
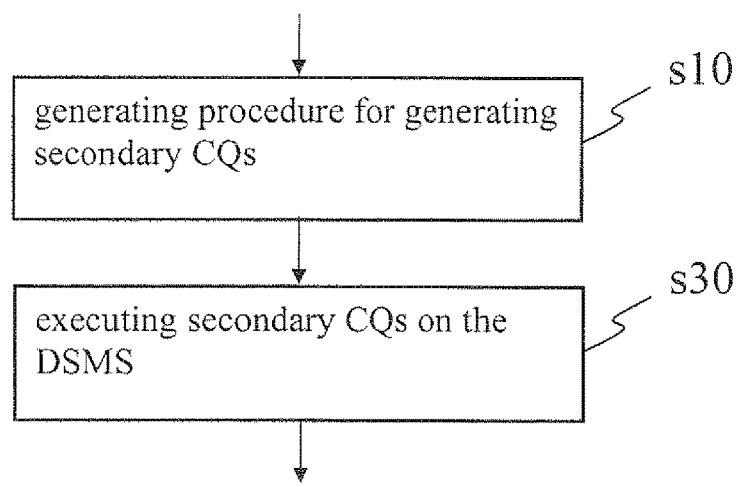
FIG. 5a is a flowchart of a method in one embodiment of the invention, wherein, after the generating procedure, secondary CQ(s) are executed on the DSMS.

FIG. 5a is a flowchart of a method in one embodiment of the invention, comprising, in addition to the generating procedure s10 already discussed with reference to FIG. 2, a step of executing s30 the secondary CQ(s) on DSMS 2. The secondary CQ(s) are executed in the same manner as primary CQ(s) except that the output data stream(s) 6 resulting from the execution of the secondary CQ(s) are not sent to any external application. The secondary CQ(s) are executed in anticipation of the potential reception of a request, by an external application, to execute a CQ matching on the secondary CQ(s). When there is a match, the output data stream(s) 6 resulting from the requested CQ can immediately be sent out to an external application expecting it. The state information resulting from the execution of the secondary CQ is used upon initiating the execution of a matching ad-hoc primary CQ.

Figure 5B:
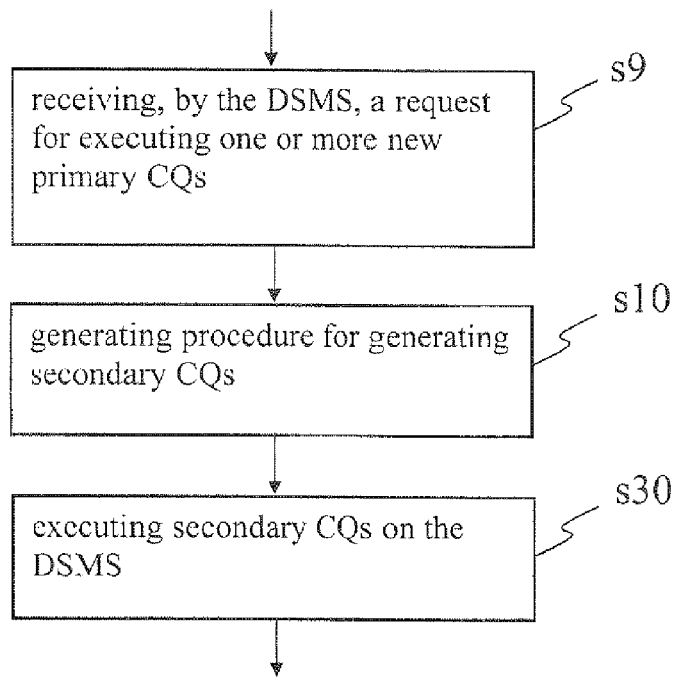

FIG. 5b is a flowchart of a method in one embodiment of the invention, which combines the embodiments of FIGS. 3 and 5a. Namely, after receiving s9, by DSMS 2, a request, from an external application, for executing, on DSMS 2, one or more new primary CQs, generating procedure s10 is executed. In generating procedure s10, secondary CQ(s) are generated based at least on the newly received primary CQ(s), followed by executing s30 the secondary CQ(s) on DSMS 2.

Figure 6:
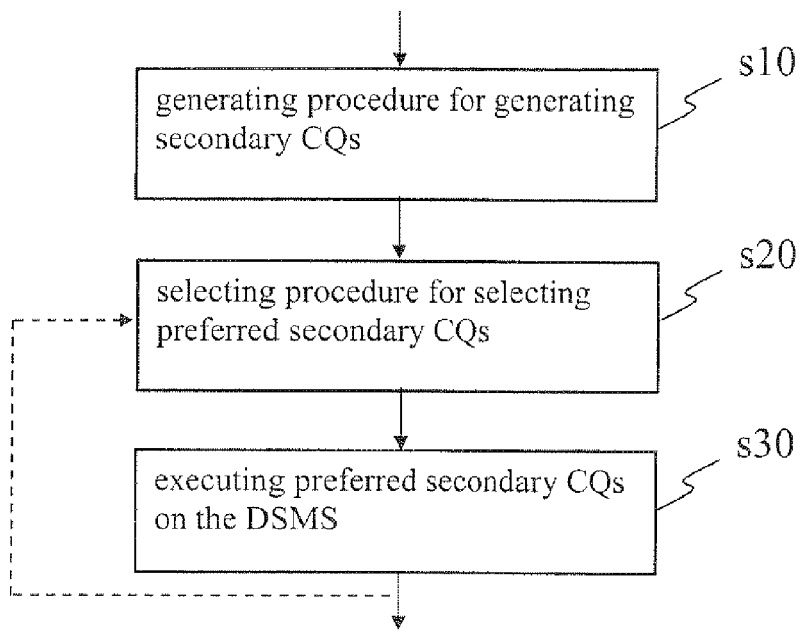

FIG. 6 is a flowchart of a method in one embodiment of the invention, which combines the embodiments of FIGS. 4a and 5a. Namely, after executing generating procedure s10 already discussed with reference to FIG. 2 and selecting procedure s20 already discussed with reference to FIG. 4a, the preferred secondary CQ(s) are executed s30 on DSMS 2. Similarly as explained above, the preferred secondary CQ(s) are executed in anticipation of the potential reception of a request, by an external application, to execute on DSMS 2 a CQ matching the secondary CQ(s). When there is a match, the output data stream(s) 6 resulting from the requested CQ can be sent out without delay to the external application(s) expecting it.

The dashed arrow returning, after step s30, to step s20 indicates that DSMS 2 may determine periodically whether additional secondary CQ(s) can be selected, for instance if more memory or computing resources became available in the meantime, for instance following the termination of a primary CQ.

Figure 7A:
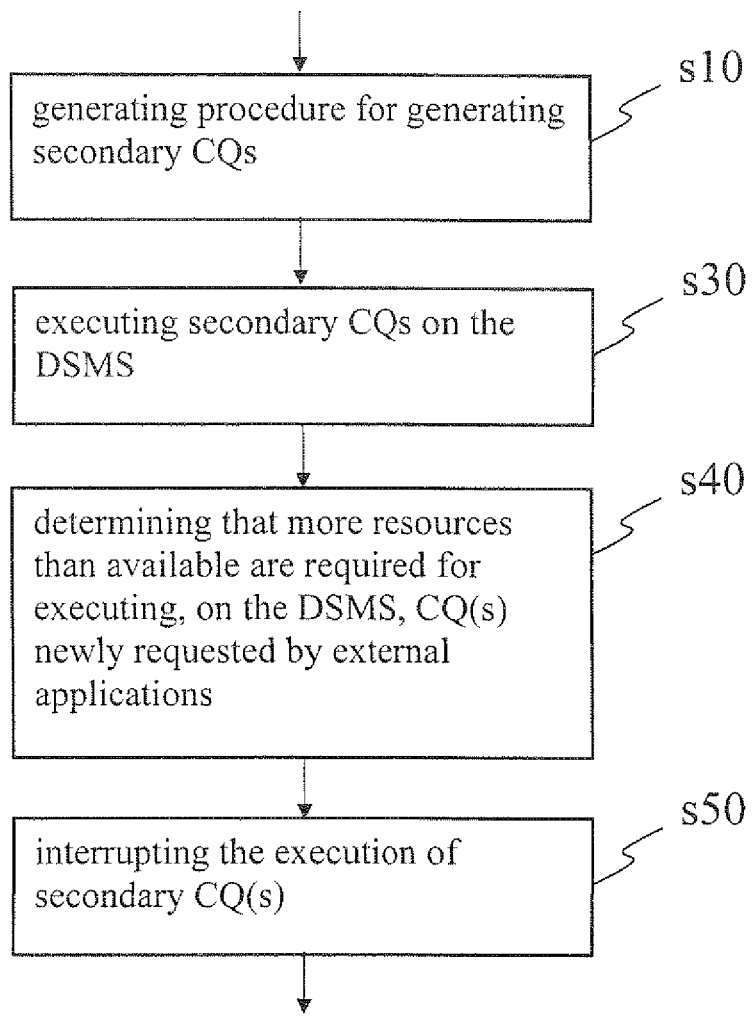
FIG. 7a is a flowchart of a method in one embodiment of the invention, wherein, after generating and executing secondary CQs, their execution is interrupted.

FIG. 7a is a flowchart of a method in one embodiment of the invention, wherein after generating procedure s10 already discussed with reference to FIG. 2 and step s30 of executing already discussed with reference to FIG. 5a, DSMS 2 determines s40 that more resources than available are required for executing, on DSMS 2, CQ(s) newly requested by external applications, and DSMS 2 then interrupts s50 the execution of one or more secondary CQ(s) which have been generated.

Figure 7B:
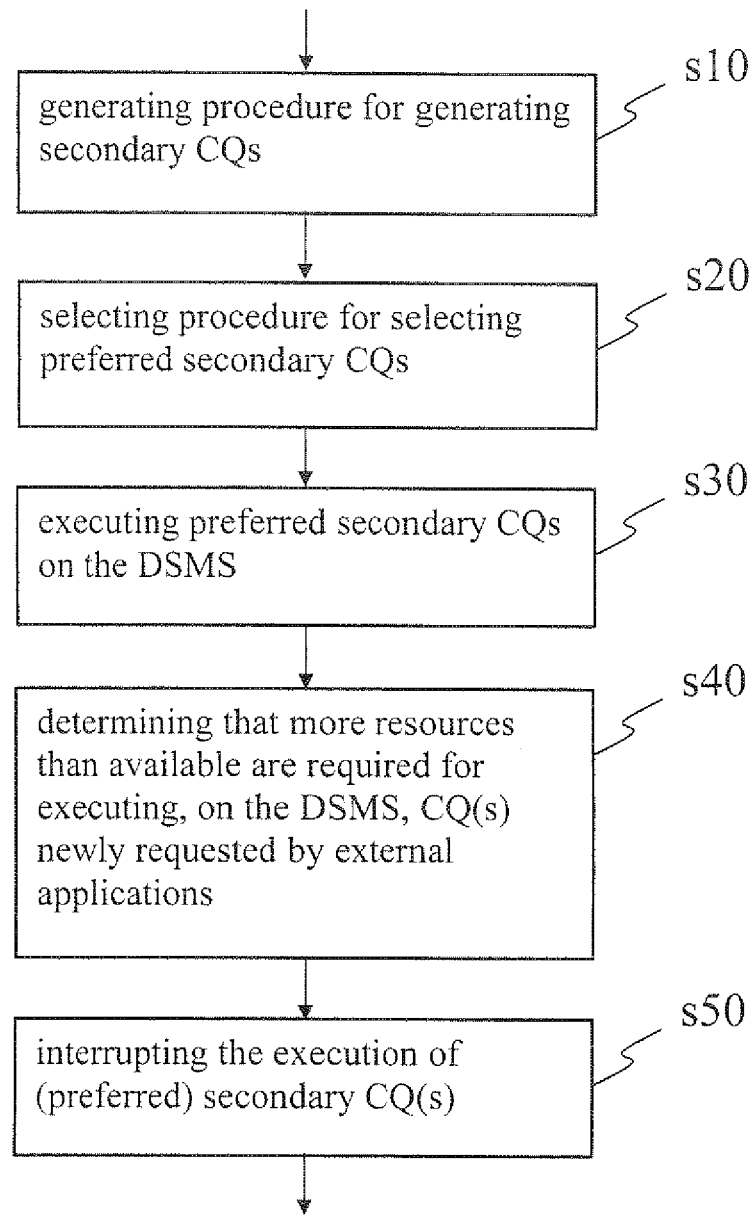
FIG. 7b is a flowchart of a method in one embodiment of the invention, wherein, after generating secondary CQs, selecting preferred secondary CQs, and executing preferred secondary CQs, their execution is interrupted.

FIG. 7b is a flowchart of a method in one embodiment of the invention, wherein after generating procedure s10, selecting procedure s20, and step s30 of executing discussed notably with reference to FIG. 6, DSMS 2 determines s40 that more resources than available are required for executing, on DSMS 2, CQ(s) newly requested by external applications, and DSMS 2 then interrupts s50 the execution of one or more preferred secondary CQ(s) which have been generated.

The operational condition wherein the DSMS 2 determines (in step s40) that more resources than available are required for executing on DSMS 2 CQ(s) newly requested by external applications, may be controlled for example by predefined parameters set in the DSMS which can establish threshold usage limits in respect to the DSMS's memory and/or processor resources.

Figure 8A:
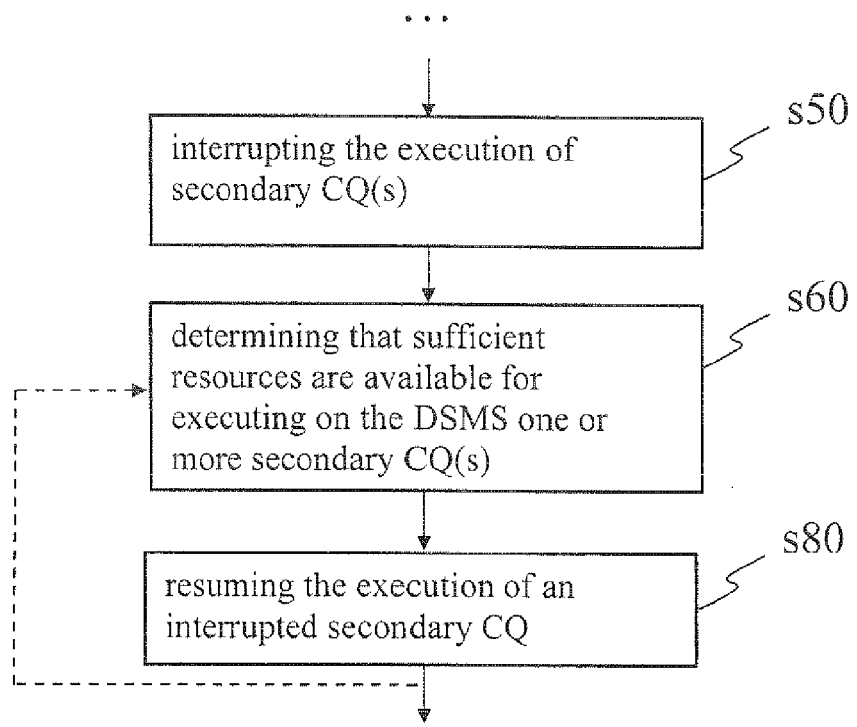
FIGS. 8a and 8b are flowcharts of methods in embodiments of the invention, wherein interrupted (preferred) secondary CQ(s) are resumed.
Figure 8B:
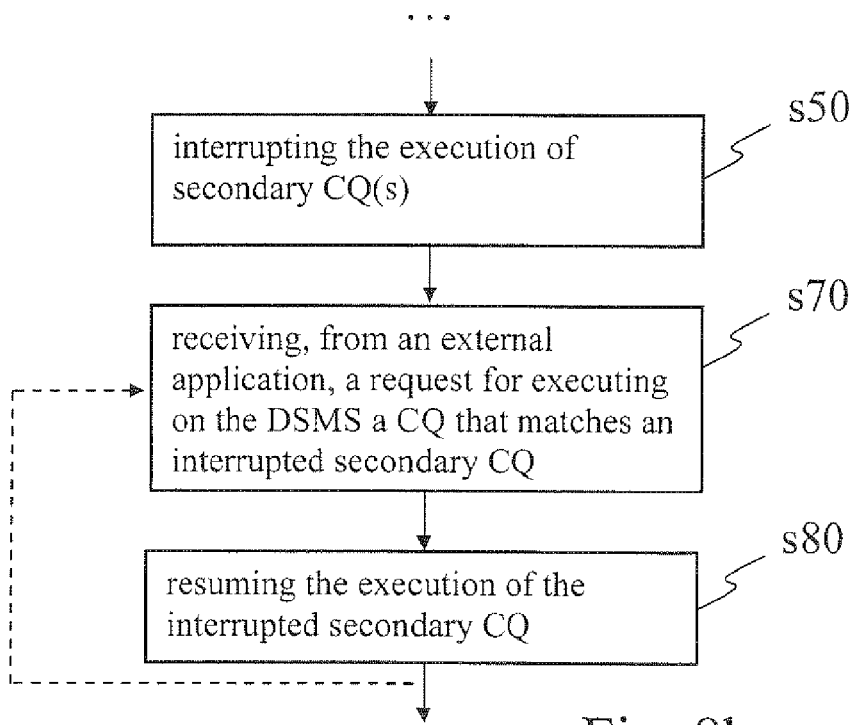

After interrupting s50 the execution of one or more (preferred) secondary CQ(s), i.e. after carrying the steps illustrated on FIG. 7a or 7b, DSMS 2 may resume s80 the execution of an interrupted secondary CQ. FIGS. 8a and 8b are flowcharts of such methods in embodiments of the invention, where an interrupted secondary CQ is resumed s80. In the method illustrated by the flowchart of FIG. 8a, DSMS 2 resumes s80 an interrupted secondary CQ after determining s60 that sufficient resources are available for executing one or more secondary CQ(s). In the method illustrated by the flowchart of FIG. 8b, DSMS 2 resumes s80 an interrupted secondary CQ after receiving s70, from an external application, a request for executing on the DSMS 2 a CQ that matches the interrupted secondary CQ. Two triggers are therefore illustrated in FIGS. 8a and 8b for resuming an interrupted secondary CQ. In one embodiment, both triggers are used. In other words, the embodiments of FIGS. 8a and 8b may be combined.

Figure 9:
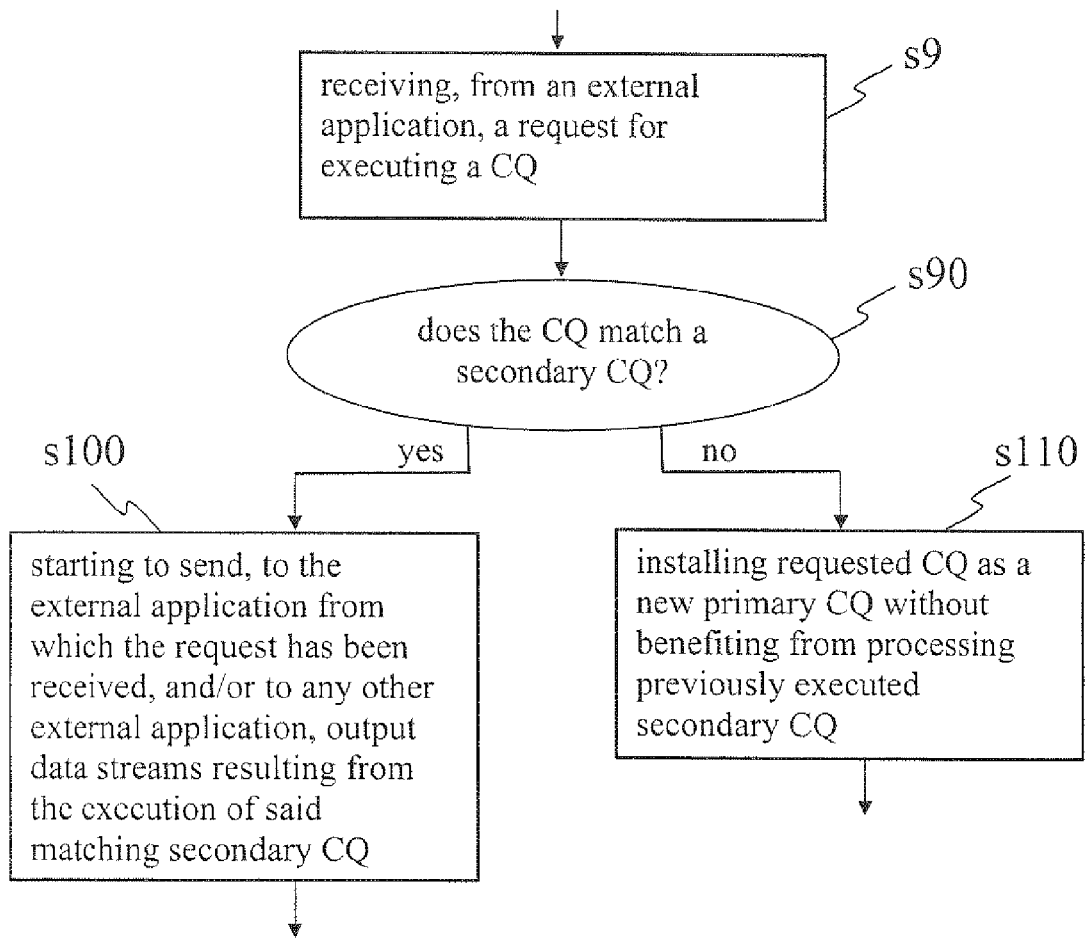
FIG. 9 is a flowchart of a method in one embodiment of the invention, wherein output data stream(s) resulting from the execution of secondary CQ(s) are sent to external applications upon reception of a request for executing a matching CQ.

FIG. 9 is a flowchart of a method in one embodiment of the invention, wherein, at the time when DSMS 2 is executing secondary CQ(s) (i.e., for instance after carrying out the steps of the methods illustrated on any one of FIG. 5a, 5b, 6, or the like), DSMS 2 receives s9, from an external application, a request for executing a CQ. DSMS 2 then determines s90 whether the CQ for which a request for execution has been received matches a secondary CQ already executed on DSMS 2. If so ("yes" following step s90), DSMS 2 starts Si 00 to send, to the external application from which the request has been received, and/or to any other external application, one or more output data streams 6 resulting from the execution of said matching secondary CQ. In this case, the output data stream(s) 6 resulting from the requested CQ can immediately be sent out to the external application(s) expecting them, thus benefiting from the pre-existence (i.e. pre-execution or only pre-provisioning) of the secondary CQ. An O&M configuration application (i.e., a requesting external application) may be the one sending the ad-hoc CQ request, whereas the corresponding result in form of output data stream(s) may be sent thereafter by the DSMS to external application(s) not necessarily corresponding to the sender of the request.

If the CQ for which a request for execution has been received does not match any secondary CQ already executed on DSMS 2 ("no" following step s90), DSMS 2 may install s110 the CQ for which a request for execution has been received as a new primary CQ. In this case however, the output data stream(s) 6 resulting from the requested CQ cannot necessarily immediately be sent out to the external application(s) expecting them, because delays may occur for provisioning the requested CQ on the DSMS 2 (setting the connection points, etc.) and gathering data over a sufficiently long period for executing the query (e.g. the so called "windows" for generating the necessary "state information").

Figure 10:
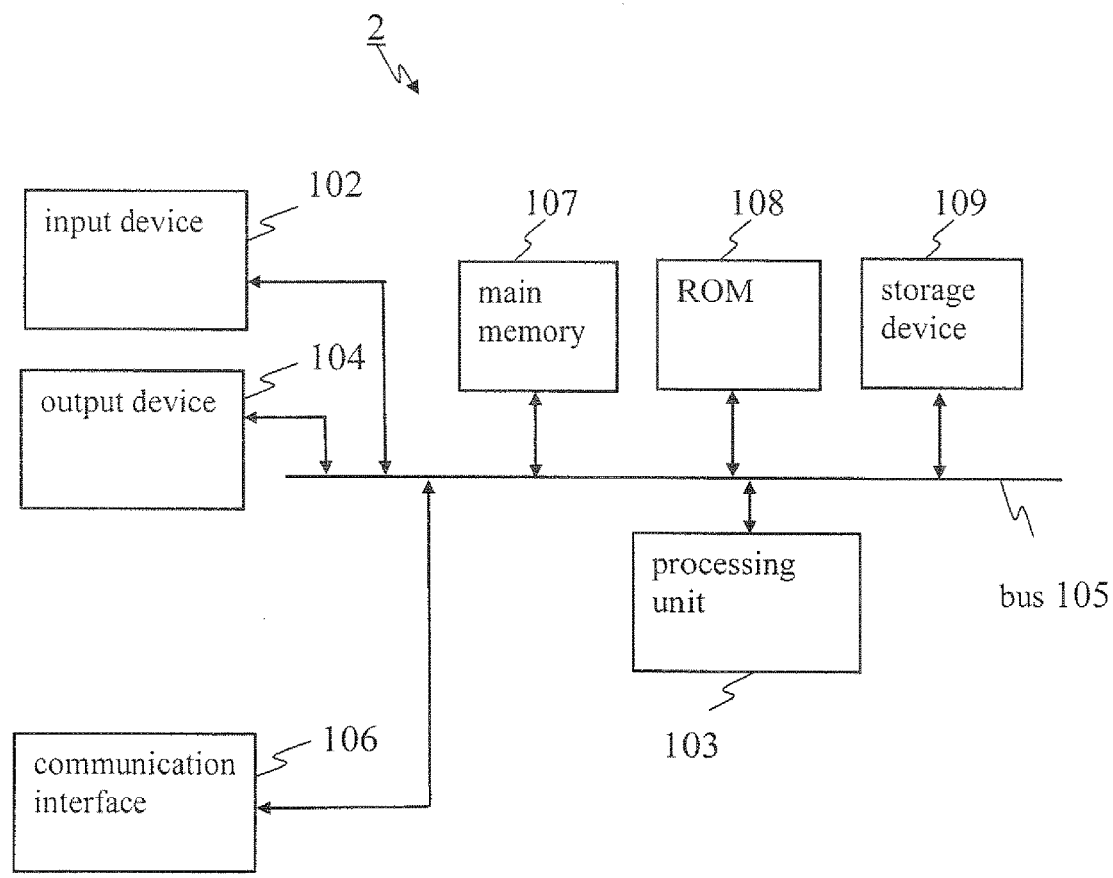
FIG. 10 is a schematic diagram of an exemplary implementation of a DSMS usable in embodiments of the invention.

FIG. 10 is a schematic diagram of an exemplary implementation of a DSMS 2 usable in embodiments of the invention. As illustrated, DSMS 2 may include a bus 105, a processing unit 103, a main memory 107, a ROM 108, a storage device 109, an input device 102, an output device 104, and a communication interface 106. Bus 105 may include a path that permits communication among the components of DSMS 2.

Processing unit 103 may include a processor, a microprocessor, or processing logic that may interpret and execute instructions. Main memory 107 may include a RAM or another type of dynamic storage device that may store information and instructions for execution by processing unit 103. ROM 108 may include a ROM device or another type of static storage device that may store static information and instructions for use by processing unit 103. Storage device 109 may include a magnetic and/or optical recording medium and its corresponding drive.

Input device 102 may include a mechanism that permits an operator, or more generally a user, to input information (such as for configuring primary CQs) to DSMS 2, such as a keypad, a keyboard, a mouse, a pen, voice recognition and/or biometric mechanisms, etc. Output device 104 may include a mechanism that outputs information to the operator, including a display, a printer, a speaker, etc. Communication interface 106 may include any transceiver-like mechanism that enables DSMS 2 to communicate with other devices and/or systems (such as with external applications). For example, communication interface 106 may include mechanisms for communicating with another device or system via a network.

DSMS 2 may perform certain operations or processes described herein. DSMS 2 may perform these operations in response to processing unit 103 executing software instructions contained in a computer-readable medium, such as main memory 107, ROM 108, and/or storage device 109. A computer-readable medium may be defined as a physical or a logical memory device. For example, a logical memory device may include memory space within a single physical memory device or distributed across multiple physical memory devices. Each of main memory 107, ROM 108 and storage device 109 may include computer-readable media. The magnetic and/or optical recording media (e.g., readable CDs or DVDs) of storage device 109 may also include computer-readable media. The software instructions may be read into main memory 107 from another computer-readable medium, such as storage device 109, or from another device via communication interface 106.

The software instructions contained in main memory 109 may cause processing unit 103 to perform operations or processes described herein. Alternatively, hardwired circuitry may be used in place of or in combination with software instructions to implement processes and/or operations described herein. Thus, implementations described herein are not limited to any specific combination of hardware and software.

Figure 11A:
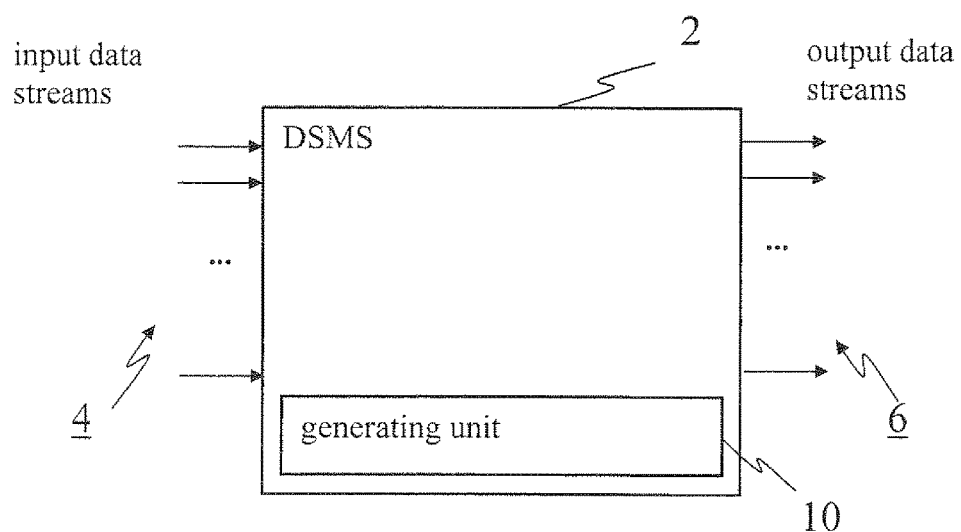
FIG. 11a schematically illustrates a DSMS in one embodiment of the invention, the DSMS being hosted on a single network node.

FIG. 11a schematically illustrates a DSMS 2 in one embodiment of the invention, DSMS 2 being hosted on a single network node. DSMS 2 is suitable for executing CQs against input data streams 4. In particular, at least one primary CQ is executed by, or provisioned to be executed by, DSMS 2 on one or more input data streams 4 to produce one or more output data streams 6. DSMS 2 comprises a generating unit 10 configured for generating at least one secondary CQ based on the at least one primary CQ.

Figure 11B:
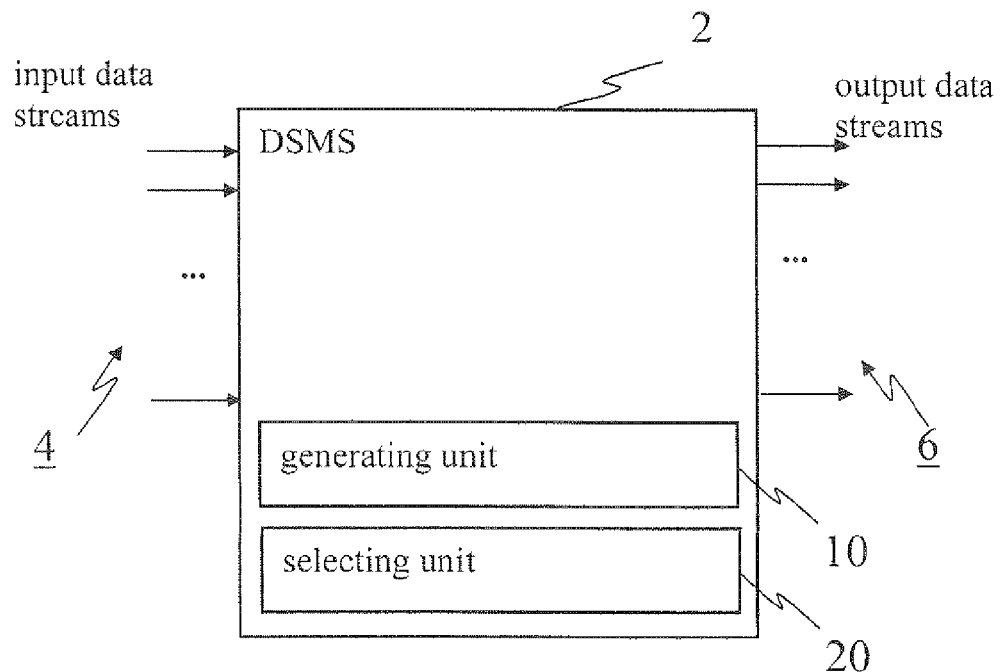
FIG. 11b schematically illustrates a DSMS in one embodiment of the invention, the DSMS being hosted on a single network node and comprising a selecting unit for selecting preferred secondary CQs.

Other units may also be part of DSMS 2, such as a selecting unit 20 configured for selecting, amongst the at least one secondary CQ, one or more preferred secondary CQs, as schematically illustrated on FIG. 11b.

Figure 11C:
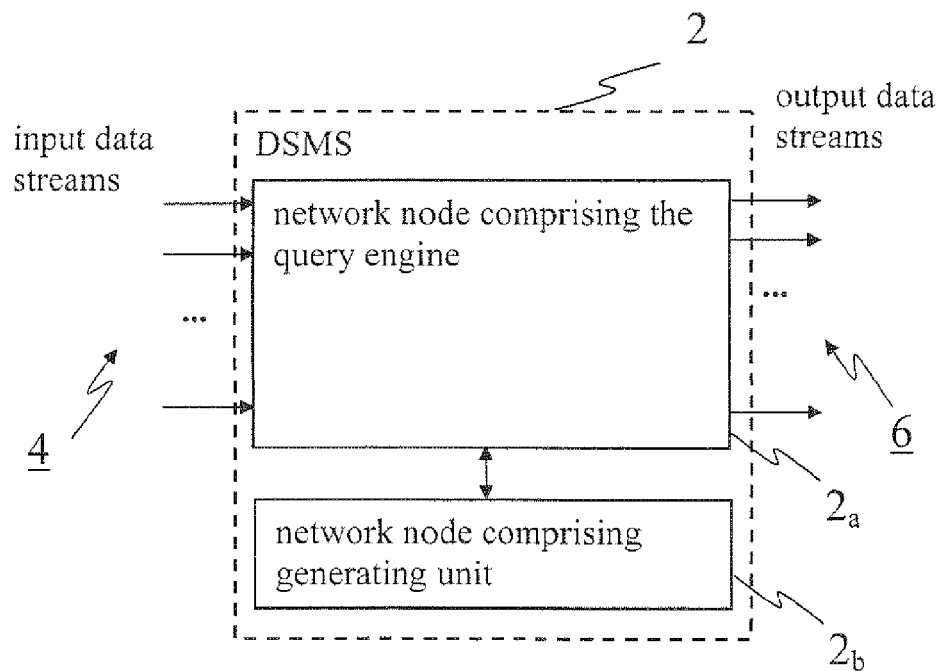
FIG. 11c schematically illustrates a DSMS in one embodiment of the invention, the DSMS being hosted on a plurality of network nodes.

DSMS 2 may also be hosted on a plurality of network nodes, as schematically illustrated on FIG. 11c. For instance, a network node $2_a$ may host the query engine for executing the CQs against the input streams and another network node $2_b$, configured for communicating with network node $2_a$, may host the generating unit 10 for generating the secondary CQs. This, however, is only an example of distribution of the functionalities of the DSMS. The query engine may itself be hosted on a plurality of network nodes (not illustrated) and the generating unit 10 may also itself be hosted on a plurality of network nodes (not illustrated).

Now, to better understand the advantages of the invention, the context in which embodiments of the invention have been developed and may be put into practice will be explained in more detail, followed by the description of further embodiments.

Data stream management systems (DSMS) address some of the main problems posed by data intensive applications.

Figure 12:
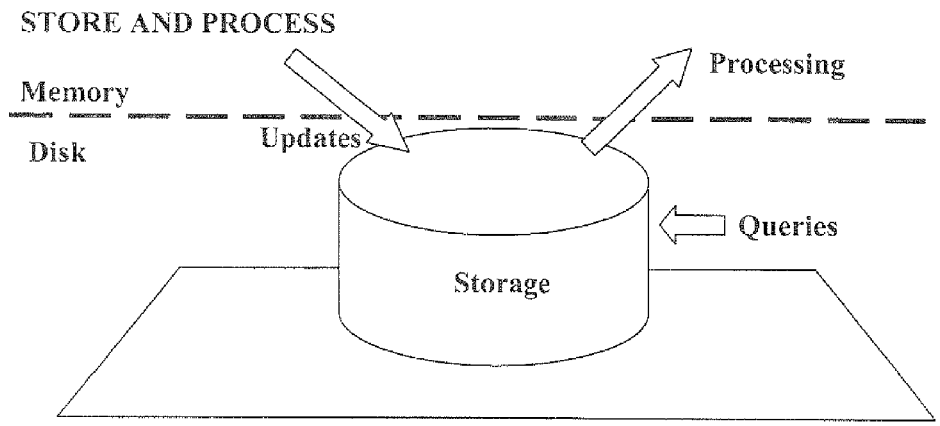
FIGS. 12 and 13 schematically illustrate the DBMS and DSMS paradigms respectively, to better understand the problems addressed by embodiments of the invention, their advantages, and the context in which they have been developed and may be put into practice.

Traditional relational database management systems (DBMSs), consisting of a set of persistent relations, a set of well-defined operations, and highly optimized query processing and transaction management components, have been researched for over thirty years and are used for a wide range of applications. Typically, data processed by a DBMS is not very frequently updated, and a snapshot of the database is used for processing queries. FIG. 12 schematically illustrates the DBMS paradigm. Updates are not very frequent and DBMS queries are executed once over a snapshot of the database.

Recent years have witnessed the emergence of another class of data intensive applications such as sensor data processing, network management in telecommunication networks and stock trading that need to process data at a high input rate. These applications need to process data continuously over long periods of time and the data is typically received in the form of a data stream. As a result, the amount of data to be processed can be unbounded or never ending.

At the same time, these applications need processing capabilities for continuously computing and aggregating incoming data for identifying interesting changes or patterns in a timely manner.

These applications are different from traditional DBMS applications with respect to data arrival rates, update frequency, processing requirements, quality of service (QoS) needs, and notification support.

Queries processed by a traditional DBMS are (typically) specified, optimized, and evaluated once over a snapshot of a database. These queries are called "DBMS queries" in the following.

In contrast, queries in a stream processing environment are specified once and evaluated repeatedly against new data over a specified life span or as long as there exists data in the stream. They are long-running queries that produce output continuously. The result is also assumed to be a stream, possibly with differing rates and schema (as compared to the input). These queries are called continuous queries (CQs).

Figure 13:
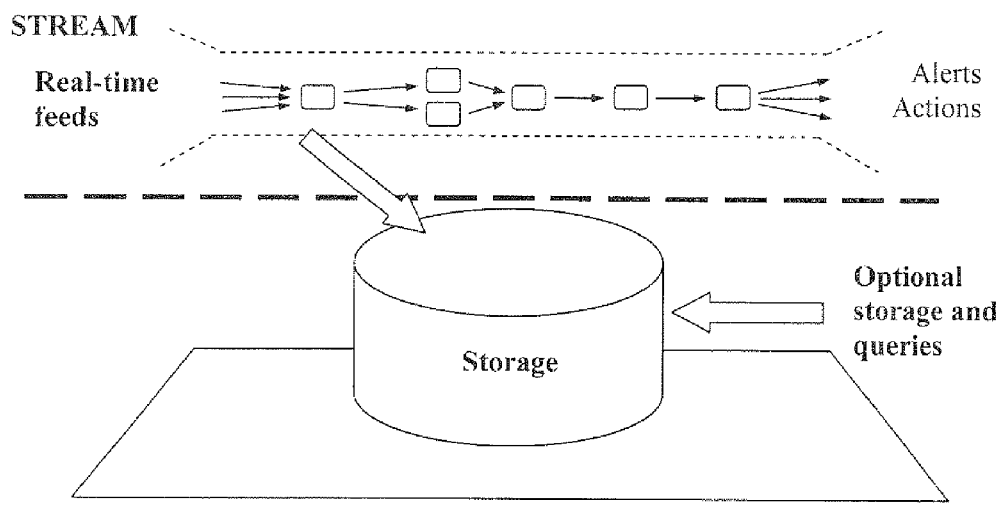

FIG. 13 schematically illustrates the DSMS paradigm. Queries executed in the DSMS are called "continuous queries" since they are continuously executed over the incoming data.

Theoretically, traditional DBMSs might be used in stream processing scenarios. The procedure would require two steps: the first one would consist in loading the incoming data streams into persistent relations whereas the second one would consist in executing the same DBMS queries over these relations repeatedly. The main problem with this approach is that the storage of stream data, indexing (as needed) and querying would add considerable delay (or latency) in the response time that may not be acceptable to many stream applications.

The requirement that data would need to be stored on secondary storage device (that has high latency) before it can be accessed and processed by a DBMS in main memory (that has low latency) is at the core of this mismatch. In addition, the "snapshot" approach for evaluating stream data may not always be appropriate as the values over an interval might be important (e.g., temperature changes) for stream processing applications. Furthermore, the inability to specify quality of service requirements (such as latency or response time) in most of traditional DBMS makes its usage less acceptable for stream applications.

Hence, the techniques developed for DBMSs need to be re-examined to meet the requirements of applications that use stream data. This re-examination has given rise to a paradigm shift along with new approaches and extensions to current techniques for query modelling, optimization, and data processing to meet the requirements of an increasing number of stream-based applications. Systems that have been developed to process data streams to meet the needs of stream-based applications are called "data stream management systems" (DSMSs) in the literature. More information on DSMS may for instance be found in S. Chakravarthy and Q. Jiang, *Stream Data Processing: A Quality of Service Perspective*, Springer, 2009 (ISBN: 978-0-387-71003) (here referred to as reference [3]).

More specifically, embodiments of the invention were developed keeping the following considerations in mind.

First, let us discuss the concept of DSMS query plans and the "window" concept.

Whenever a new query is entered into a DSMS system, a query plan must be generated (in a similar way as traditional DBMS actually do), although in some DSMS the query language is specified at such a low level that it might be directly handled as a query plan by itself.

A query plan could be understood as a sequence of basic (pre-defined) operators yielding the expected query result. For example, when a SQL query is sent to a database, the DBMS, after parsing the query, generates this sequence of basic operators executing the query. The nature of these operators depends on the specific vendor.

In DSMS, the kind of basic operators in which a query is decomposed in the query plan can comprise "stateless" as well as "stateful" operators. A stateless operator is not constrained by previous or subsequent input data. Generally, stateless operators do not impose any special requirement to data streams, since their logic can be executed in a rather straight way. One case of a "stateless operator" can comprise an operator implementing a "filter"; for example: any data whose value exceeds a predetermined value would go through whereas those data not reaching the value would be discarded.

A stateful operator requires, to come up with the final result, some kind of (internal) storage of certain data of the same or different input data streams, or produced as a result of the execution of a previous query operator. For example, the execution of a stateful operator may consist in calculating the average or the maximum value of certain data items over a certain period or when a given number of these data have been received, or performing a logical operation against data coming asynchronously from different input data streams. The term "window" is commonly used to refer to collecting by the DSMS the necessary "state information" (e.g. the time or the number of values necessary) to execute a stateful operator. As data streams are unbounded in nature, stateful operators should work only upon a finite subset of the data stream. As mentioned above, one example would be an operator implementing the average value of the previously received data items (e.g., over a certain interval, or once a certain number of data items have been received, etc). If the final value to be produced by a stateful operator had to take the whole data stream into consideration, the result would (likely) never be produced. It is thus necessary to specify a subset of data items for which the average value is to be calculated.

This subset is called a window and it is—normally—specified as a function of time (e.g. 3 seconds) or the number of received data (e.g. 40 data items). In this way, a result would be continuously produced.

Multiple queries can be executed at the same time within the DSMS, and each single query plan can share operators—or even part of its query plan—with other queries. Moreover, more than one application can be registered to receive output data streams resulting from the same query and more than one input stream can be part of the same query.

Figure 14:
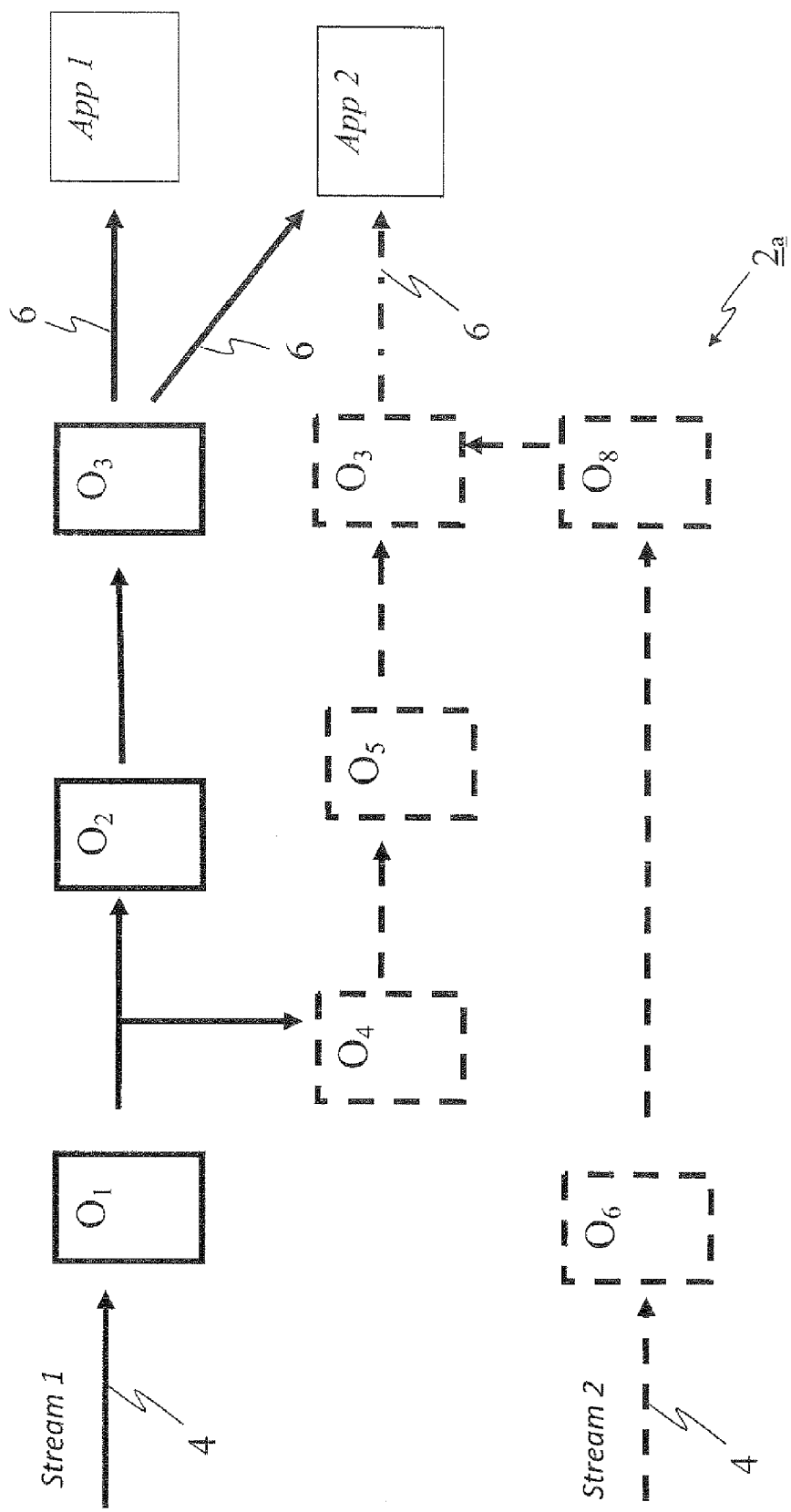
FIG. 14 schematically illustrates an example of two CQs running on a DSMS.

FIG. 14 schematically illustrates an example of two CQs running in the same DSMS that receives various input data streams (4) and that produces, as a result, various output data streams (6). $O_i$ refers to a query operator of the query engine. The continuous-line operators execute a first CQ whereas the dashed-line ones execute a second CQ. As illustrated in the example, the first CQ comprises an arrangement of query operators acting on data values received from a first input data stream (Stream 1, with reference numeral "4") and also acting on values produced by previous operators of said first query. In turn, the second CQ comprises an arrangement of query operators wherein, in the example, some of which also act on data values produced by query operators of the first CQ (e.g. operator "$O_4$"). The results of the first CQ are sent in the form of output data stream 6 towards two different servers hosting two external applications ("App 1", "App 2"), whilst the results of the second CQ are sent in the form of output data stream towards only one of these servers (in the example, to the server implementing the external application "App 2").

The example illustrated in FIG. 14 represents what is referred herein as "primary CQs", as long as it shows that the corresponding result produced by these ("primary") CQs are sent to servers outside the DSMS which host external applications. However, the arrangement of query operators illustrated in FIG. 14 might also well represent part of the query engine in the DSMS adapted to execute two different CQs which have been generated motu propio in the DSMS (by the generating procedure disclosed earlier) based on other ("primary") CQs already executed within the DSMS, or already provisioned to be executed therein. In other words, the first and second CQs illustrated schematically in FIG. 14 might represent what is referred herein as "secondary CQs"; although in such a case, no output data streams 6 resulting from these ("secondary") CQs are yet sent outside by the DSMS $2_a$.

Secondly, let us discuss some further problems addressed by embodiments of the invention, especially associated with the so-called predefined and ad-hoc queries.

Every query entered in a DSMS is referred to as a continuous query (CQ) because the query is continuously executed against incoming data streams. Due to this persistence in time, the process of entering a query into a DSMS is also referred to herein as "registering" a query.

Continuous queries (CQs) can be further categorized into two different types: predefined CQs are registered/provisioned in the DSMS from the outset, i.e. before data actually start flowing in, whereas ad-hoc CQs are registered in the DSMS after the input data streams have already started to arrive (i.e. the DSMS is up and running, executing queries and receiving data from the input streams; in said situation any new query registered into the system is referred to as "ad-hoc" query).

Ad-hoc queries may involve, and often involve, stateful operators, and therefore "windows". If an ad-hoc query involves stateful operators, it would be necessary, without the invention, for an application server (i.e., an external application) registering an ad-hoc query in a DSMS to wait some time until results start to be produced by the DSMS (i.e. in the form of the corresponding output data streams). In particular, this delay is the time needed by the DSMS for filling up the corresponding windows. However, for some applications (i.e. for external applications residing in servers that receive output data streams produced by a DSMS), this is not acceptable and some of these applications may benefit from, or even may require, receiving some results (although approximated) from the very beginning; that is, as soon as the query is registered in the DSMS.

Therefore, the timely handling by a DSMS of a received ad-hoc query would imply knowing in advance by the DSMS the data that might be needed to process any prospective ad-hoc query that can be received in the DSMS. Accordingly, all data coming from all input data streams would be continuously stored in at least a semi-permanent manner (e.g. using a predefined window length) by the DSMS in order to make them available to handle any possible ad-hoc query that could be received. Alternatively, a DSMS administrator could configure manually which data are to be—at least—semi-permanently stored by the DSMS to attend in a quick manner any possible ad-hoc query that might be received at any moment.

This solution is problematic since it would consist in increasing, in an unbounded manner, the data storage means of the DSMS in order to cope with any possible ad-hoc query so as to serve it in an appropriate (i.e., short) time.

Reference [1] discloses—e.g. in section 2.1—the so-called "connection points", which in short consist in the creation of memory storages at different points of the existing "query operators". By increasing the number of "connection points", and its storage capacity, the problem of timely attending a prospective ad-hoc query by a DSMS can be mitigated. Namely, the more are the "connection points" and the higher their associated storage capacity, the shorter will be the initial delay to start producing data resulting from a prospective "ad-hoc" CQ once such CQ is received. However, this kind of approach requires a substantial over-dimensioning of the storage means of a certain DSMS, wherein a substantial percentage of these (over-dimensioned) storage capabilities might barely, or even never, be used by the CQs it executes (either: "preconfigured" or "ad-hoc"). On the other hand, if the storage means of a certain DSMS are not over-dimensioned, this kind of approach (i.e., the use of "connection points") may be detrimental to the number of CQs that said DSMS will be able to serve.

It has been recognized that the above solutions have the following problems.

First, the above solutions rely solely on the administrator's experience and knowledge. Further, efficiently allocating "connection points" requires the DSMS administrator to know in advance what the subsequent ad-hoc CQs can be.

Secondly, query plans are usually very complex and it is not feasible to define a "connection point" at every operator output due the impact that this would have on the overall system performance (e.g. memory for storing data, CPU resources for processing the storage point logic . . . ).

Third, there is also no control over the impact that a specific "connection point" might have in the overall system performance (depending on the connection point location within the query plan, the consumed memory and CPU demands might significantly change). In this sense, storing by a DSMS the suitable data for the most likely subsequent ad-hoc query that it might eventually receive—provided that said kind of information is known in advance—might degrade its performance beyond the QoS acceptable limits; unless the storage means of the DSMS are substantially increased.

In view of these problems, embodiments of the invention encompass a solution that comprises the DSMS generating by itself a set of one or more secondary CQs and their corresponding "query operators", wherein said secondary CQs are derived from the active (i.e., primary) CQs (either: "preconfigured" or "ad-hoc") that are currently being executed within the DSMS, or just recently configured on it (i.e., provisioned), and of its "query operators", and wherein said secondary CQs are different from said active (i.e., primary) CQs. Once generated, the set of secondary CQs are executed by the DSMS against the input data streams 4, as any other CQ running in the DSMS, but their resulting data is not sent into any output data stream until a new "ad-hoc" CQ is provisioned in the DSMS 2 which matches one of the secondary CQs of the set.

It has been recognized that, in many instances, the applications (i.e., external applications) registering ad-hoc queries in the DSMS aim at refining some previous result. For instance, a DSMS might be used within a telecommunications network in order to gain insights about the behaviour of certain user groups. This task normally demands successive analysis (that is, ad-hoc queries) over the corresponding input data streams (coming from, e.g., call detailed records (CDR), multimedia sessions, etc.) in real time.

Embodiments of the invention address this kind of scenario by inferring, from a previous set of CQs (predefined and ad-hoc) which are currently being executed by the DSMS (or from an ad-hoc query which is just received by the DSMS), and with some degree of approximation, the data that is most likely to be required to handle prospective ad-hoc CQs that might be received by the DSMS. The data most likely to be required to handle prospective ad-hoc CQs, as referred above, do not necessarily correspond to data received as part of any of the input streams as such, but may correspond to data resulting from already existing query operator belonging to an active CQ being executed in the DSMS.

For example, in network scenarios involving the analysis of user data, such as in a scenario where telecommunication networks operators wish to collect and analyze data related to subscribers, data coming through different input data streams deal, in some way or another, with user-related events (e.g. geographical location, phone calls, requested services, user profile . . . ), i.e. events which relate to the users subscribing to a telecommunication network. These events originating from different input data streams and relating to the same individual users may be merged in the query plan execution, in order to provide the appropriate result (e.g., gathering various information coming from different input data streams but relating to the same users). An ad-hoc query may for instance consist in requesting a list of all the users located within a specific geographical area, regardless of their profile, who are also using a specific service. The inventor has notably recognized that a subsequent ad-hoc query might arrive, which could aim at refining the previous one (e.g. requesting a list of all the users located within the same specific geographical area as before, who are using a particular flavour of the very same service and belong to a specific user profile, such as 'gold'). The prospective CQs may also involve data belonging to input data streams that are not used by any existing primary CQs (such input data streams including for instance an input data stream conveying phone calls information).

Figure 15:
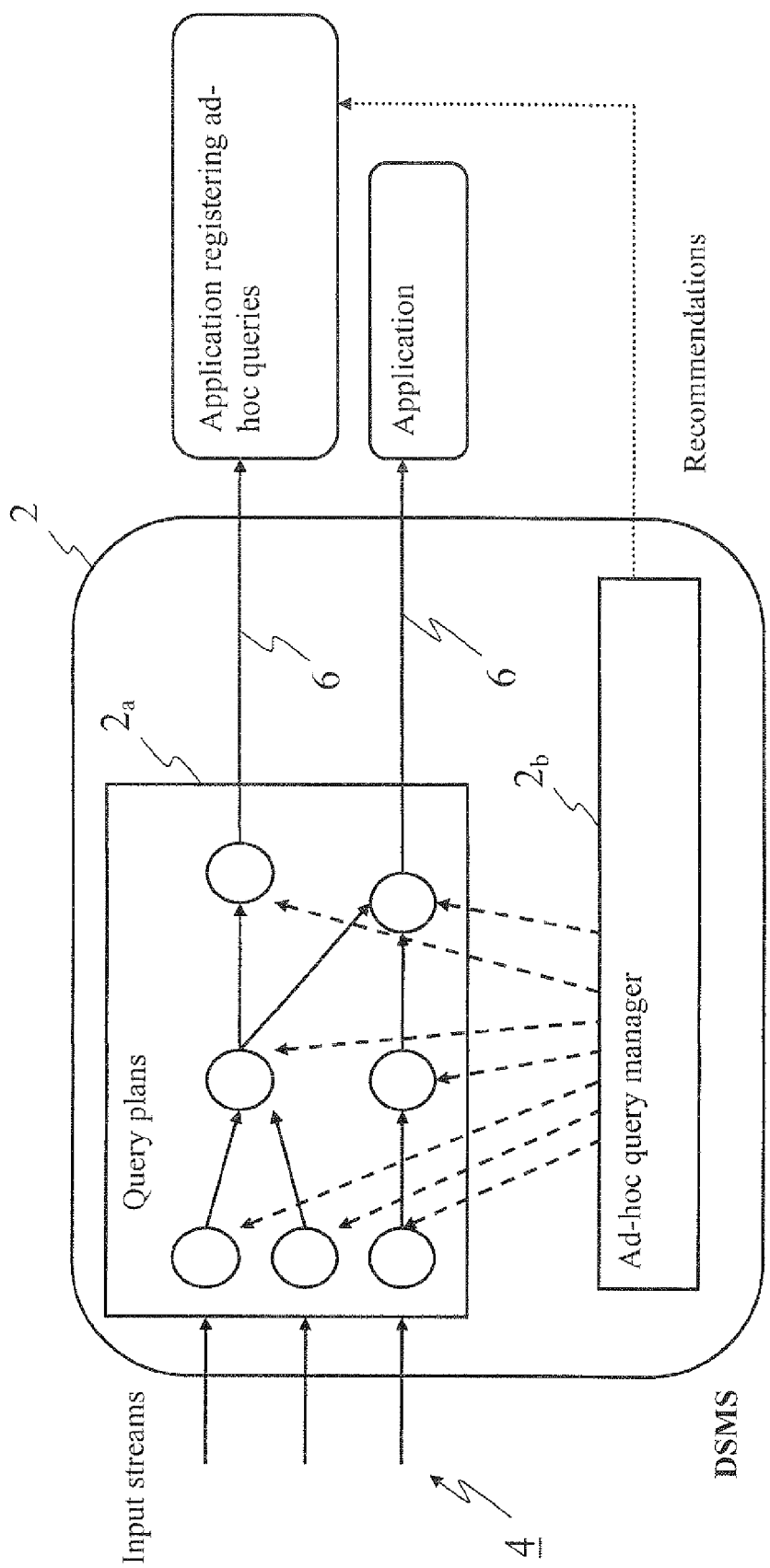
FIGS. 15 and 16 schematically illustrate DSMSs each including an ad-hoc query manager, in embodiments of the invention.

In order to achieve this, a so-called ad-hoc query manager $2_b$ is included as part of the DSMS 2, as schematically illustrated in FIG. 15. Ad-hoc query manager $2_b$ comprises a generating unit 10 as described above, with reference to FIGS. 11a, 11b and 11c. Ad-hoc query manager $2_b$ may be hosted on the same network node as the query engine $2_a$ implementing the query plans (as explained with reference to FIG. 11a) or, alternatively, ad-hoc query manager $2_b$ and query engine $2_a$ may be hosted on different network nodes capable of communicating with each other (as explained with reference to FIG. 11c).

Although the embodiment illustrated in FIG. 15 will be described in more detail later with references to FIGS. 16 to 19, a brief explanation may be provided as follows.

Ad-hoc query manager $2_b$ (comprises a generating unit 10) determines a set of possible pieces of data that might be used by prospective ad-hoc queries. Ad-hoc query manager $2_b$ does so by analyzing the data held by the query operators pertaining to the primary CQs (i.e., CQs that are currently being executed by the DSMS 2, or ad-hoc CQs that have just been provisioned in the DSMS 2). The dashed arrows from the ad-hoc query manager $2_b$ to the query operators in FIG. 15 schematically illustrate this process. Ad-hoc query manager $2_b$ provides a list of "candidate" ad-hoc CQs likely to be requested (i.e., secondary CQs). The list is optionally ordered. In one embodiment, for every secondary CQ, the cost of executing the secondary CQ, for example in terms of expected memory and CPU consumption, and/or its likelihood to be requested are assessed, and each secondary CQ is assigned a priority value.

In one embodiment, only the secondary CQs generated by the DSMS that have been assigned a high priority are executed by the DSMS. This reduces the impact on the overall performance of the DSMS, which may have to execute the primary CQs under certain QoS constraints.

In one embodiment, information regarding the secondary CQs that are executed on the DSMS is sent to one or more external applications as recommended subsequent CQs (as illustrated on FIG. 15 by the dotted arrow from ad-hoc query manager $2_b$ to the "applications registering ad-hoc queries"). Since these secondary CQs are anyway being executed on the DSMS, requesting them by external applications would not degrade the system performance.

In one embodiment, a dynamic mechanism for deciding which secondary CQ to execute is provided to account for possible variations over time of the resources demand in the DSMS (e.g. memory and/or CPU consumption). For example, if a secondary CQ is currently being executed by the DSMS, and the DSMS starts demanding more memory and/or more CPU resources, then, at that very moment, its execution can be interrupted by the DSMS (as illustrated on FIGS. 7a and 7b). Meanwhile, if the DSMS later starts demanding less memory and/or CPU resources, the DSMS can resume the execution of one or more interrupted secondary CQs (as illustrated on FIGS. 8a and 8b).

In one embodiment, if an external application registers not one but several ad-hoc CQs in the DSMS, the ad-hoc query manager $2_b$ can execute the same logic as described above wherein the bunch of ad-hoc CQs received from said external application may be considered as a single query for the sake of generating a secondary CQ. This is a particular case of the weighting mechanism explained in the next paragraph: whenever more than one CQs are registered, there are two options: consider that every CQ has the same weight (in this case, the set of registered CQs can be considered as a single CQ) or not (in this case, the latest registered CQs may be regarded as more important and granted a higher weight).

However, in some cases, the same external application may register new ad-hoc CQs in the DSMS which are not related to old CQ(s) registered earlier by said external application and that are already executed by the DSMS, in the sense that, for example, said new CQ(s) imply the usage by the DSMS of new data (from the same or different input data stream/s) which were not used by the old CQ(s) registered for said external application. This may be the case when, for example, an external application is looking for new insights, which are not related to existing queries and may imply the usage of new data not used beforehand. Therefore, in one embodiment, when new ad-hoc CQs are received by the DSMS and these new ad-hoc CQs are not related with the primary CQs executed, or provisioned to be executed, on the DSMS, a dynamic weighting mechanism may be executed in which new secondary CQs that are generated based on the newest received ad-hoc queries (as illustrated on FIGS. 3, 4b and 5b) are prioritized for execution by the DSMS at the detriment of early generated CQs. In this embodiment, the most recently generated secondary CQs may be assigned a higher priority value than the oldest secondary CQs. In other words, when a new ad-hoc CQ request is received in the DSMS, ad-hoc query manager $2_b$, with its generating unit 10, may first generate a set of one or more secondary CQs based on the information in the just received new ad-hoc CQ requests, ad-hoc query manager $2_b$ may then assign priority values to the newly generated secondary CQs, and ad-hoc query manager $2_b$ may then re-arrange the priority values currently assigned to the old secondary CQs. Thus, the new secondary CQs get a higher priority compared to the other secondary CQs or at least with respect to the other secondary CQs executed by the DSMS with respect to the same external application that led to the generation of the new secondary CQs.

A DSMS 2 comprising an ad-hoc query manager $2_b$, in one embodiment of the invention, will now be described in more detail with reference to the schematic illustration of FIG. 16.

Figure 16:
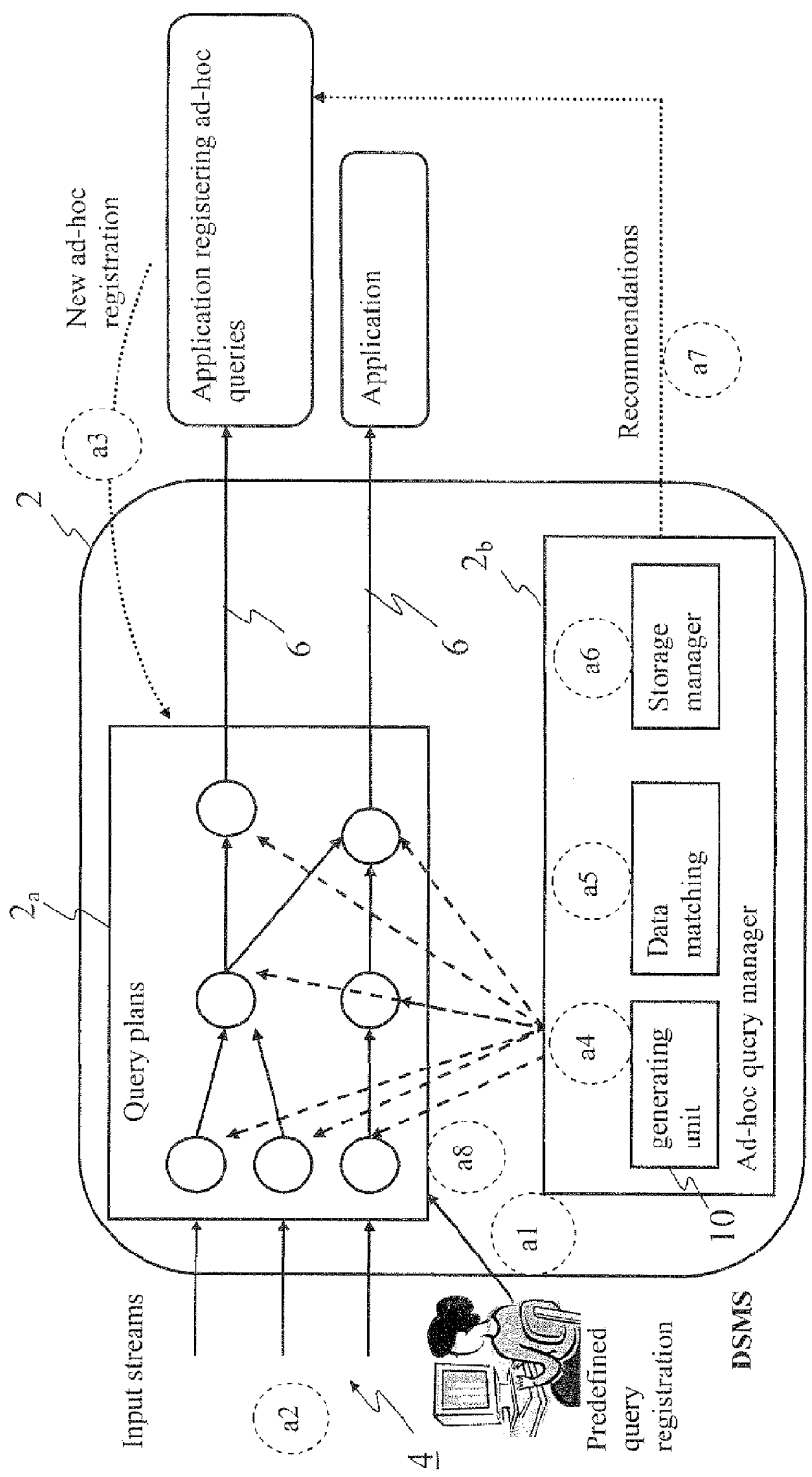

Ad-hoc query manager $2_b$—with its generating unit 10, which is not illustrated in FIG. 16—is configured for generating a set of one or more secondary CQs to be executed by the DSMS. The query operators making up the query plan for executing said secondary CQs, as well as the data said query operators act upon, are determined by a process that takes in to account the primary CQs currently being executed by the DSMS and the ad-hoc primary CQs that have been just requested to be executed by the DSMS.

Steps a1-a8 described below with reference to FIG. 16 relate to a situation where ad-hoc query manager $2_b$ generates a set of one or more of secondary CQs, which generation is triggered by the reception of an ad-hoc CQ request at DSMS 2 from (or with respect to) an external application. Said external application resides in a server wishing to receive, or already currently receiving, information from DSMS 2 via output data streams 6 produced by CQs executed on DSMS 2. Steps a1-a8 will now be explained in more detail with reference to FIG. 16.

In step a1, the DSMS administrator—or any user with granted privileges—registers a set of predefined CQs before any incoming data is fed into DSMS 2 (label "Predefined query registration" on FIG. 16).

Each CQ acts upon a predefined subset of data received in the input data streams 4 and the result of the CQs are sent out, in the form of output data streams 6, to a number of external applications. These external applications usually request some sort of registration to the corresponding CQ beforehand.

DSMS 2 generates a query plan which usually involves: a set of operators handling the incoming data, and a set of operators handling the query logic.

In step a2, input data streams 4 start feeding the system. As a result of the execution of the predefined CQs, DSMS 2 then starts sending out the query result to the corresponding external applications.

In step a3, an external application registers a new ad-hoc CQ. The corresponding query plan is generated.

In step a4, ad-hoc query manager $2_b$ is reported about this fact, i.e. ad-hoc query manager $2_b$ is made aware of the registration of this new ad-hoc CQ. Generating unit 10 is in charge of generating a prioritized list of secondary CQs. To accomplish this, generating unit 10 performs a two-step process (steps a4.1-a4.2):

In step a4.1, generating unit 10 first builds a tree data structure that will facilitate the generation of the prioritized list.

Figure 17:
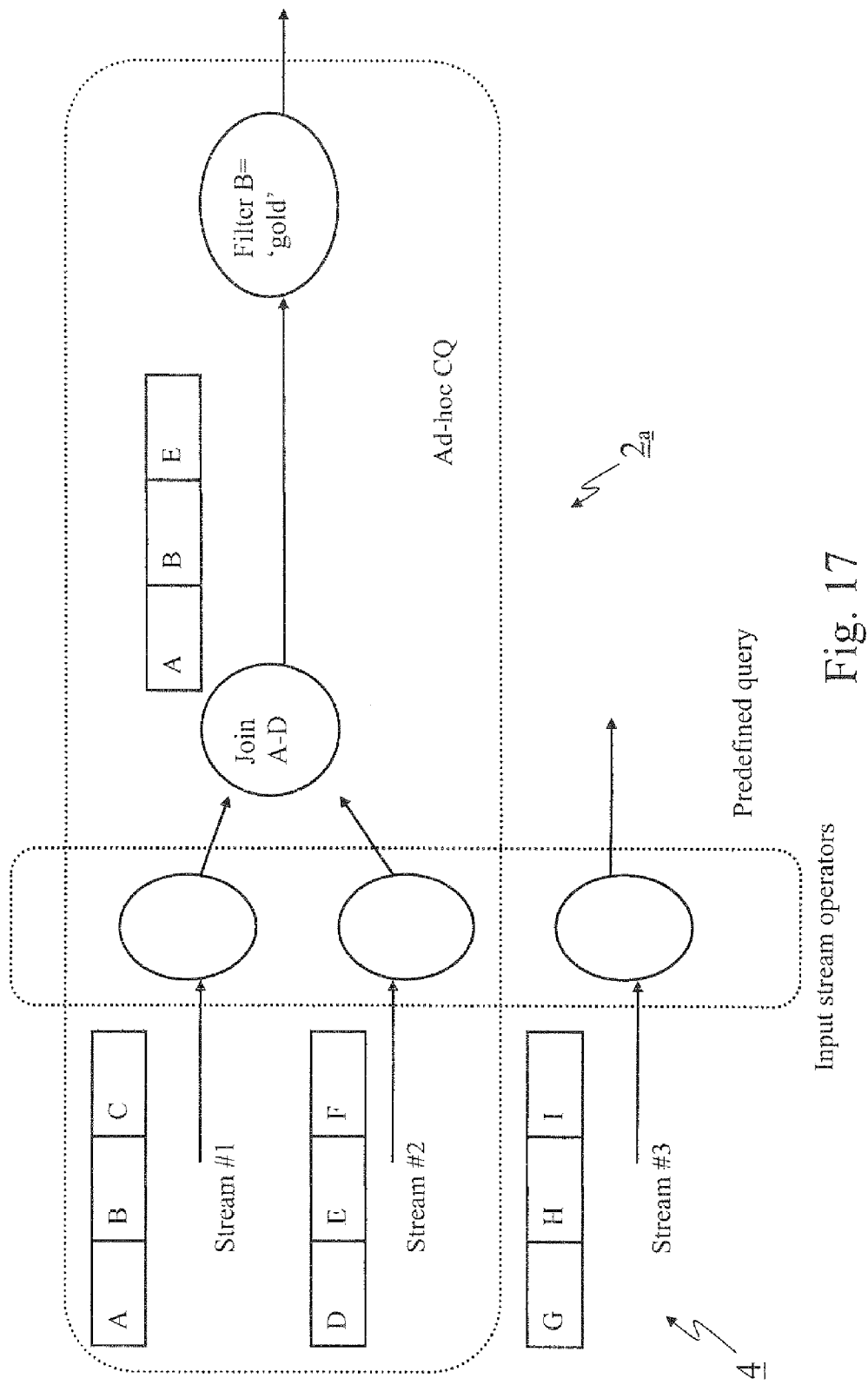
FIG. 17 schematically illustrates query plans involving a predefined CQ and an ad-hoc CQ, in one embodiment of the invention.

In order to illustrate how this tree data structure may be built, let us consider, as schematically illustrated on FIG. 17, the query plans involving a predefined CQ and an ad-hoc CQ that has just been registered in the DSMS.

The ad-hoc CQ is fed by two input data streams 4, illustrated on FIG. 17 as "Stream #1" and "Stream #2" respectively. In the illustrated example, input data stream #1 comprises tuples with three elements (A, B, C) whereas input data stream #2 comprises tuples with three other elements (D, E, F). A tuple is a structured data, whose structure is known in advance. For example, an input data stream can convey weather measurements from a given sensor with the following structure: sensor identifier (ID), measured temperature (T), measured humidity (H), and measured pressure (P). In this case, the input (i.e., incoming) data stream is made of a sequence of tuples, each of them following the layout specified above, that is: (ID, T, H, P), (ID, T, H, P), (ID, T, H, P), etc. Similarly, one or more input data streams 4 may convey data tuples referring to a given user of a telecommunication system. For example, input data streams #1 and #2 may convey tuples of data related to a given user, coming from different servers in a telecommunication network, wherein data tuples received in input stream #1 identifies the user by means of, respectively, data "A" and "D" (e.g. they convey the MSISDN assigned to the user), and wherein other data in these input data streams convey further information related to said user (e.g. the kind of category in data "B", the user's geographical position in data "E", information about the usage of a certain service in data "F" etc).

A join operator (labelled "Join A-D" on FIG. 17) merges both streams using the specified variables (A, D). If both streams carry data tied to users, A and D might be the user identities. The join operator then merges the information belonging to the same user. The other variables carry data tied to the specified user such, for example, the kind of category group the user belongs to (e.g., "gold", "silver", "bronze") in variable B, location in variable C, and service used (e.g. Voice over IP) in variable E. This means that, whenever the value of A matches the value of D, the outgoing tuple following the join operator would be (A, B, E). Data component C from input data stream #1 and data component F from input data stream #2 are removed in the join execution. Data received through different input data streams 4 are not necessarily synchronized, since they come from different network nodes and may be triggered by a different set of causes. Thus, it is necessary to implement a stateful operator using windows (the join in this case) for persistent storage of the received values.

The last operator (query operator labelled "Filter B='gold'" on FIG. 17) retains only those tuples wherein B (e.g. a user type of category) is equal to the value 'gold'.

Input stream #3, involving (G, H, I), is not used by the ad-hoc query.

Thus, in user-centric networks wherein a telecommunication network operator may benefit from the use of a DSMS to collect and analyze data related to the subscribers, many of the input data streams received by the DSMS can include some kind of user identifier that matches or can be used to match by means of predefined relationships the identifiers used in other input data streams. Thus, it is possible to merge the data belonging to different input data streams. The input data streams may be received by the DSMS from different nodes in a telecommunication network (e.g. nodes informing about usage of services, positioning, charging, etc). Every join operator may therefore represent the fact that at least two data components belonging to different input data streams are equivalent, in the sense that these data components convey the same information (in this case A=D). It is also possible to configure this information in the system (e.g. A=D=G). In case different identities are used in each input data stream (e.g. one uses the MSISDN whereas the other uses the IMSI), the relations among the identities should be stated in a database which would feed the system as another input data stream. Thus, it is possible to associate (e.g. by a "join" operator) data coming from different input data streams received in the DSMS by means of the conveyed identities.

The following naming conventions will be used hereinafter. In an exemplary query "SELECT name, age, price FROM Subscriber WHERE Category='Gold'", "name", "age", "price", "Subscriber" and "Category" are data components, "'Gold'" is a value, and "SELECT", "FROM", "WHERE" are the operators.

The tree data structure can be built as follows:
Level #1

In level #1 are situated the input data streams with data that are filtered in the query process. Further, data belonging to these input data streams but which are not included in the query response are omitted.

In other words, a first group of input data streams, here referred to as "first group input data streams", is formed comprising the input data streams of which at least some data is used in a filtering condition in the at least one primary CQ. Referring to FIG. 17, "Stream #1" would be included in the first group input data streams because data component "B" is used in the filtering condition "Filter B='gold'".

Then, a first group of data components, here referred to as "first group data components", is formed comprising the data components of the first group input data streams which are used in a filtering condition and the data components of said first group input data streams which are included in one or more output data streams. Referring to FIG. 17, data component "B" would be included in the first group data components because data component "B" is used in the filtering condition "Filter B='gold'", and data component "A" (="D", or equivalent to "D") would be included in the first group data components because data component A belongs to "Stream #1", an input data stream of said first group input data streams, and is included in an output data stream (i.e., "A, B, E" after the filter operator).

Level #2

Every other input data stream feeding data into the ad-hoc query, but with no filtered elements, are also part of the tree (level #2).

In other words, a second group of input data streams, here referred to as "second group input data streams", is formed comprising the input data streams of which no data is used in a filtering condition in the at least one primary CQ but of which at least some data is nevertheless used in the at least one primary CQ. Referring to FIG. 17, "Stream #2" would be included in the second group input data streams because no data component of "Stream #2" is used in any filtering condition, such as in "Filter B='gold'".

Then, a second group of data components, here referred to as "second group data components", is formed comprising data components of said second group input data streams. Referring to FIG. 17, data components "D" (="A", or equivalent to "A"), "E", and "F", or only some of these data components, would be included in the second group data components because these data components are those of "Stream #2", which belongs to the second group input data streams.

Level #3

The input data streams not feeding data in any primary CQ are located in level #3.

In other words, a third group of input data streams, here referred to as "third group input data streams", is formed comprising the input data streams of which no data is used in the at least one primary CQ. Referring to FIG. 17, "Stream #3" would be included in the third group input data streams because no data of "Stream #3" is used in the primary CQ.

Then, a third group of data components, here referred to as "third group data components", is formed comprising data components of said third group input data streams. Referring to FIG. 17, data components "G" (="A", or equivalent to "A"), "H", and "I", or only some of these data components, would be included in the third group data components because these data components are those of "Stream #3", which belongs to the third group input data streams.

FIG. 18 schematically illustrates a tree data structure built from the input data streams. When the process is applied to the example of FIG. 17, a resulting tree data structure would be as shown on FIG. 19. The resulting tree data structure shown on FIG. 19 may be used to generate one or more secondary CQs. In the tree data structure shown on FIG. 19, data components "A", "D", and "G" are the matching identities and data components "B", "E", "F", "H", and "I" are those usable for generating one or more secondary CQs.

Data component "C" is not present, reflecting the assumption that, if "C" was important, it would have been used in the primary CQ.

Let us now return to the steps described with reference to FIG. 16, notably to explain how secondary CQs may be formed based on the above-discussed tree data structure.

In step a4.2, generating unit 10 generates, based on the tree data structure, a prioritized list of secondary CQs. The secondary CQs may then be executed by the DSMS 2, although the result of the secondary CQs is not (yet) sent via any output data stream 6 to any external application in any server with which the DSMS communicates, or can communicate.

The procedure for generating said secondary CQs may be as follows:

(1) Start in the level #1 nodes. Keep the values that were not filtered out and request one data component belonging to the level #2 that has not been previously requested. Repeat this process until all the possibilities are exhausted.

In other words, this step (1) comprises: (a) combining a value of the first group data component(s), where the value has not been filtered out, with second group data component(s) to generate a combination that is not used by any of the at least one primary CQ; and (b) repeating step (a) until all possibilities are exhausted.

(2) Repeat the procedure but using the filtered out values.

In other words, this step (2) comprises: (c) combining a value of the first group data component(s), where the value has been filtered out, with second group data component(s) to generate a combination that is not used by any of the at least one primary CQ; and (d) repeating step (c) until all possibilities are exhausted;

(3) Repeat step (1) but including the level #3 instead of level #2.

In other words, this step (3) comprises: (e) combining a value of the first group data component(s), where the value has not been filtered out, with third group data component(s) to generate a combination that is not used by any of the at least one primary CQ; and (f) repeating step (e) until all possibilities are exhausted;

(4) Repeat step (2) but including the level #3 instead of level #2.

In other words, this step (4) comprises: (g) combining a value of the first group data component(s), where the value has been filtered out with third group data component(s) to generate a combination that is not used by any of the at least one primary CQ; and (h) repeating step (g) until all possibilities are exhausted.

The resulting combinations may therefore be combinations of values and data components. In one embodiment, the query operators (SELECT, FROM, WHERE, JOIN, etc.) are not modified to create new secondary CQs. For instance, in the above-mentioned exemplary query "SELECT name, age, price FROM Subscriber WHERE Category='Gold'", with "name", "age", "price", "Subscriber" and "Category" being data components, "'Gold'" being a value, and "SELECT", "FROM", "WHERE" being the operators, neither the operators (SELECT, FROM, WHERE, etc.) nor the structure of the query is modified to generate new secondary CQs.

When the process is applied to the example of FIG. 17, the value that is not filtered out is "gold" (since it is maintained) whereas the filtered out values are assumed to be "silver" and "bronze". The process for generating said secondary CQs would yield:

As a result of above-mentioned step (1):

| A-D B('gold'), F |
|---|

Namely, the value of "B" being equal to "gold" (i.e. "B('gold')"), which is a non-filtered value (referred herein as "not filtered out" values) of the first group data component(s), is combined with second group data component(s) (i.e., "E" and "F") to generate a combination that is not used by a primary CQ. The combination "A-D B('gold'), E" is already used in a primary CQ while the combination "A-D B('gold'), F" is not already used in a primary CQ and thus obtained. Step (1) yields one combination, i.e. one secondary CQ.

As a result of above-mentioned step (2):

| A-D B('silver') E |
|---|
| A-D B('bronze') E |
| A-D B('silver') F |
| A-D B('bronze') E |

Namely, the values "B('silver')" and "B('bronze')", which are values of the first group data component(s) which have been filtered (referred herein as "filtered out" values), are combined with second group data component(s) (i.e., "E" and "F") to generate combinations that are not used by a primary CQ. All four resulting combinations are not already used in a primary CQ and thus kept. Step (2) yields four combinations, i.e. four secondary CQs.

As a result of above-mentioned step (3):

| A-G B('gold') H |
|---|
| A-G B('gold') I |

Namely, the value "B('gold')", which is a non-filtered value of the first group data component(s), is combined with third group data component(s) (i.e., "H" and "I") to generate combinations that are not used by a primary CQ. The two resulting combinations are not already used in a primary CQ and thus kept. Step (2) yields two combinations, i.e. two secondary CQs.

As a result of above-mentioned step (4):

| A-G B('silver') H |
|---|
| A-G B('silver') I |
| A-G B('bronze') H |
| A-G B('bronze') I |

Namely, the values "B('silver')" and "B('bronze')", which are filtered values of the first group data component(s), are combined with third group data component(s) (i.e., "H" and "I") to generate combinations that are not used by a primary CQ. All four resulting combinations are not already used in a primary CQ and thus kept. Step (4) yields four combinations, i.e. four secondary CQs.

Any combination involving two or more data components belonging to the same level can also be added to the list, such as for instance:

| A-D B('gold') E F |
|---|
| A-D B('silver') E F |
| A-D B('bronze') E F |
| A-G B('gold') H I |
| A-G B('silver') H I |
| A-G B('bronze') H I |

In step a5, for each of the previous results and using a stream mining process, the DSMS (using the "data matching" module as illustrated on FIG. 16) may check whether there is some correlation between values of the involved data. Stream mining processes consume relatively few computation resources (which is important in DSMS scenarios) and provide results in a reasonable time. Moreover, the stream mining processes can also adapt themselves to concept shifts (that is, when the detected correlations change over time, a stream mining process can adapt itself to the changes as well).

In the example of FIG. 17, these stream mining processes would look for correlations between "B(with the value 'gold')" and "F", "B(with the value 'silver')" and "E", etc. Although there are several approaches, the simplest one (sampling) may be sufficient. In this way, samples may be taken from the corresponding input data streams (this should not have a big impact is system performance in terms of memory consumption since the number of stored samples is rather small) and any "fast" cross correlation algorithm can be executed.

For those cases in which a correlation does not exist (i.e., the correlation is below a predefined threshold), the secondary CQ may be discarded. Such decision may for instance be configured in the DSMS, in one embodiment.

For example, it may be assumed that only "A-D B('silver') E" and "A-G B(gold') H" are selected for generating a secondary CQ, whereas other combinations, which may imply these or other data, and/or on other operators acting based on these or other data or their values, may be discarded.

In other words, in one embodiment, correlation may be carried out with the values. For example, if one candidate is: "A-D B('gold')F" (with "F" conveying information about the usage of a certain service), it might be interesting to know whether there is a correlation between 'gold' users and the services used by them. Provided that there is no specific correlation (i.e. 'gold' users behave in a similar way as 'silver' and 'bronze' users when it comes to service usage), then this candidate CQ may be discarded (because the result of this CQ is not (likely) significant). On the other hand, if there is a positive correlation (e.g. 'gold' users prefer specific services which are different from the services preferred by 'silver' and 'bronze' users), then this CQ might be considered as interesting and, in fact, the CQ may be recommended to the external application. The skilled person would recognize that there are different implementations for performing this correlation, with stream mining techniques being one example of implementation. So, the solution may consist in taking samples from the incoming streams (first stage) and execute one of these implementations over the samples (second stage).

In step a6, the DSMS evaluates the best location of the storages. This is the task of the "storage manager" module illustrated on FIG. 16. There may be different possibilities and the goal is to come up with the optimal solution.

For instance, the secondary CQ "A-D B('silver') E" could be implemented with one storage per data component (i.e., one for "A", another one for "B('silver')", and so on) or it is also possible to take advantage of the ad-hoc query plan and store the output of the join operator "A-D" (storing only those tuples where "B='silver'" is satisfied).

For example, the query plans may be assessed by examining the possible locations for the connection points, one by one, from the external applications to the input data streams. For example, whenever the output of a given operator matches the data of a secondary CQ, excepting perhaps some data values, the storage may be allocated there. In the worst case, the storages should be allocated at the output of the corresponding input data streams.

Once this is done, the DSMS may evaluate the impact of executing a query plan for a secondary CQ, e.g. in terms of memory and CPU. Memory may be evaluated using the statistics of the input data streams (in DSMS, this information is usually generated). CPU consumption involves, mainly, the context change (that is, the time needed for preparing the execution of any query operator), since the time needed for storing data is relatively negligible.

Preferably, only those plans whose requirements fit current QoS system restrictions, or current load conditions in the DSMS, are accepted. For instance, if the DSMS is running out of memory and the secondary CQ "A-G B('gold') H" requires a large amount of memory, the associated storage is not booked.

In step a7, the DSMS may optionally notify information about the secondary CQs it has generated, e.g. as suggestions/recommendations of further ad-hoc queries that can be registered to the DSMS, to one or more external applications as valuable information that may be used by these external applications to, for example, obtain new insights that can not be currently inferred by these external applications from data conveyed in the output data stream(s) currently received from the DSMS. Accordingly, any of the servers/devices serving said external applications may subsequently act responsive to the suggestions received from the DSMS, and, using the information received from the DSMS about recommended CQs, issue one or more new ad-hoc queries to the DSMS so as to obtain new information not received before. In such a case, accomplishing by the DSMS the execution of these eventual further ad-hoc CQs that were being hinted/recommended from the DSMS to an external application would not significantly affect the DSMS performance, since the necessary arrangements for their execution can be set out within the DSMS in advance by the generating procedure of secondary CQs, which will likely match to said eventual further ad-hoc CQs. Moreover, their results (i.e. in the form of one or more output data stream) can be sent to the servers/devices hosting the external application(s) with a minimum (or null) delay.

For example, the external applications that already use the DSMS to receive information via one or more output data streams, as well as other external applications that might also provide queries (e.g. ad-hoc queries) to be executed by the DSMS for receiving information from there, may benefit of the auto-generating of secondary CQs procedure executed by the DSMS as described herein. This may allow mitigating the delay due in the DSMS to generate output data streams based on execution of CQ(s) which can be (ad-hoc) requested, at any time, by external applications.

More specifically, in the embodiment described by step a7, the DSMS communicates with one or more external applications for reporting information about the one or more secondary CQs generated therein. Therefore, if any of these external applications decides to generate and send a further ad-hoc query towards the DSMS based on—say—secondary CQs notified as "suggested/recommended" by the DSMS, the DSMS will start producing the corresponding data stream(s) with a minor, or even substantially null, delay, given that it already have generated in advance the corresponding arrangements for executing the (secondary) CQs.

The window length used in the storages of the DSMS with respect to the generated (and suggested) CQs may also be notified to the external applications in order to improve the accuracy of the prediction. This optional refinement is detailed in the step a8 below.

In other words, an ad-hoc CQ registered by an external application may imply an execution "window" (i.e., if it involves stateful operators). However, in some cases, the window length is not known in advance. It may be assumed that the window length should be the same as the one used in previous CQs, or it may be set by configuration, or even dynamically set by the system depending on the available memory. Therefore, whenever the preliminary response is sent to the external application, it might be useful to include the used window length. For example, if a time window is used with a length of 1 hour and the new registered CQ uses a 2-hour time window, then the result might include information that the new registered CQ has been assessed over a 1-hour time window (instead of the requested 2-hour time window). Although the used window length does not match the requested one, it might still be interesting enough (i.e. statistically significant). Moreover, if the selected window is reported to the external application in advance, this information might be used in the subsequent query (e.g., if the system notifies that the window length being used is 1 hour, the subsequent query registered by the application may take this information into account and set the window length accordingly).

In step a8, if a subsequent primary CQ is registered, the DSMS may check whether it matches any of the secondary CQs that were generated in advance. If so, then a preliminary output, based on the results produced by a matching secondary CQ, can be calculated by the DSMS and sent out to the external application within an output data stream. As the windows used in the storages and the one defined in the registered query might differ, the results sent by the DSMS immediately to the external application registering the (matching) primary CQ—i.e. in the form or one or more output data streams—might only be approximated, although (statistically) significant for being used immediately by the receiver external application.

Therefore, embodiments of the invention propose methods enhancing the handling of newly requested ad-hoc CQs in terms of delivering the results (i.e., the resulting output data streams) without delay, i.e. from very moment in which the CQ is registered in the DSMS, or to minimize said delay as much as possible.

If these newly requested ad-hoc CQs include stateful operators, it would normally be necessary to wait some time (window) until results are generated. With embodiments of the invention, it is possible to generate results—although approximated—also during this transitional period.

Moreover, the implementation secures a minimum impact on the overall DSMS performance, notably without requiring to substantially increasing the data storage capacity of the DSMS.

Where the terms "generating unit", "selecting unit", etc. are used herewith, no restriction is made regarding how distributed these elements may be and regarding how gathered elements may be. That is, the constituent elements of a unit may be distributed in different software or hardware components or devices for bringing about the intended function. A plurality of distinct elements may also be gathered for providing the intended functionalities.

Any one of the above-referred units of a network node may be implemented in hardware, software, field-programmable gate array (FPGA), application-specific integrated circuit (ASICs), firmware or the like.

In further embodiments of the invention, any one of the above-mentioned and/or claimed generating unit and selecting unit, etc. is replaced by generating means, and selecting means, etc. respectively, or by a generator and a selector, etc. respectively, for performing the functions of the generating unit and selecting unit, etc.

In further embodiments of the invention, any one of the above-described procedures, steps or processes may be implemented using computer-executable instructions, for example in the form of computer-executable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method, carried out by a data stream management system (DSMS) in communication with at least one external application registering ad-hoc continuous queries with the DSMS, the data stream management system being suitable for executing continuous queries on input data streams, and at least one continuous query, here referred to as at least one primary continuous query, is one of executed by and provisioned to be executed by, the data stream management system on at least one input data stream to produce at least one output data stream, the method comprising:
   generating, by the DSMS, at least one additional continuous query as at least one secondary continuous query by predicting which ad-hoc continuous query will be requested by the at least one external application before the ad-hoc continuous query is requested by the at least one external application;
   executing, by the DSMS, the at least one secondary continuous query on the data stream management system on at least one input data stream in anticipation of receipt of a request to execute a requested ad-hoc continuous query matching the at least one secondary continuous query before the requested ad-hoc continuous query is received;
   storing, by the DSMS, an output data stream generated by execution of the at least one secondary continuous query;
   after executing the at least one secondary continuous query and after storing the output data stream generated by the execution:
      receiving, by the DSMS, from the at least one external application, a request to register an ad-hoc continuous query; and
      determining, by the DSMS, that the received request to register the ad-hoc continuous query matches the executed at least one secondary continuous query; and
   as a result of determining that the received request to register the ad-hoc continuous query matches the executed at least one secondary continuous query, transmitting, by the DSMS, the stored output data stream generated by the execution of the at least one secondary continuous query to satisfy the request to register the ad-hoc continuous query;
each one of the at least one generated secondary continuous query being different from each one of the at least one primary continuous query; and
the generation of the at least one secondary continuous query based on the at least one primary continuous query and in the generation of the at least one secondary continuous query:
(i) a first group of input data streams comprises the input data streams of which at least some data is used in a filtering condition in the at least one primary continuous query;
(ii) a second group of input data streams comprises the input data streams of which no data is used in a filtering condition in the at least one primary continuous query but of which at least some data is used in the at least one primary continuous query;
(iii) a third group of input data streams comprises the input data streams of which no data is used in the at least one primary continuous query;
(iv) a first group of data components comprises the data components of the first group of input data streams which are used in a filtering condition and the data components of said first group of input data streams which are included in at least one output data stream;
(v) a second group of data components comprises, if the number of the second group of input data streams is not zero, data components of said second group of input data streams; and
(vi) a third group of data components comprises, if the number of the third group of input data streams is not zero, data components of said third group of input data streams;
the generating the at least one secondary continuous query based on the at least one primary continuous query comprises at least one of:
(a) combining a value of the first group of data components which has not been filtered out with the second group of data components to generate a combination that is not used by any of the at least one primary continuous query;
(b) repeating step (a) until all possible combinations have been generated;
(c) combining a value of the first group of data components which has been filtered out with the second group of data components to generate a combination that is not used by any of the at least one primary continuous query;
(d) repeating step (c) until all possible combinations have been generated;
(e) combining a value of the first group of data components which has not been filtered out with the third of group data components to generate a combination that is not used by any of the at least one primary continuous query;
(f) repeating step (e) until all possible combinations have been generated;
(g) combining a value of the first group of data components which has been filtered out with the third group of data components to generate a combination that is not used by any of the at least one primary continuous query; and
(h) repeating step (g) until all possible combinations have been generated.

2. The method of claim 1, further comprising:
a selecting procedure comprising selecting, amongst the at least one secondary continuous query, at least one preferred secondary continuous query.

3. The method of claim 2, wherein the selecting procedure takes into account at least one of:
expected memory resources for execution, by the data stream management system, of the at least one secondary continuous query;
expected processing resources for execution, by the data stream management system, of the at least one secondary continuous query; and
likelihood that the at least one secondary continuous query is requested by the at least one external application.

4. The method of claim 1, further comprising:
determining that more resources than available are required for executing, on the data stream management system, at least one continuous query newly requested by the at least one external application; and
interrupting the execution of the at least one secondary continuous query.

5. The method of claim 4, further comprising resuming the execution of the interrupted at least one secondary continuous query one of:
when determining that sufficient resources are available for executing, on the data stream management system, the at least one secondary continuous query; and
when receiving, from the at least one external application, a request for executing, on the data stream management system, a continuous query that matches the interrupted at least one secondary continuous query.

6. The method of claim 1, wherein the generating of the at least one secondary continuous query is based on the at least one primary continuous query comprises carrying out, successively, steps (a), (b), (c), (d), (e), (f), (g) and (h).

7. A data stream management system (DSMS) in communication with at least one external application registering ad-hoc continuous queries with the DSMS, the DSMS comprising at least one network node, the data stream management system being suitable to execute continuous queries on input data streams, and, at least one continuous query, here referred to as the at least one primary continuous query, is one of executed by and provisioned to be executed by, the data stream management system on at least one input data stream to produce at least one output data stream, the data stream management system comprising:
processing circuitry configured to:
generate at least one additional continuous query as at least one secondary continuous query by predicting which ad-hoc continuous query will be requested by the at least one external application before the ad-hoc continuous query is requested by the at least one external application; and
execute the at least one secondary continuous query on the data stream management system on at least one input data stream in anticipation of receipt of a request to execute a requested ad-hoc continuous query matching the at least one secondary continuous query before the requested ad-hoc continuous query is received;
store an output data stream generated by execution of the at least one secondary continuous query;
after execution of the at least one secondary continuous query and after storing the output data stream generated by the execution:
receive, from the at least one external application, a request to register an ad-hoc continuous query; and
determine that the received request to register the ad-hoc continuous query matches the executed at least one secondary continuous query; and
as a result of determining that the received request to register the ad-hoc continuous query matches the executed at least one secondary continuous query, transmit the stored output data stream generated by the execution of the at least one secondary continuous query to satisfy the request to register the ad-hoc continuous query;
each one of the at least one generated secondary continuous query being different from each one of the at least one primary continuous query; and
the generation of the at least one secondary continuous query based on the at least one primary continuous query such that:
(i) a first group of input data streams comprises the input data streams of which at least some data is used in a filtering condition in the at least one primary continuous query;
(ii) a second group of input data streams comprises the input data streams of which no data is used in a filtering condition in the at least one primary continuous query but of which at least some data is used in the at least one primary continuous query;
(iii) a third group of input data streams comprises the input data streams of which the data components are not used in the at least one primary continuous query;
(iv) a first group of data components comprises the data components of the first group of input data streams which are used in a filtering condition and the data components of said first group of input data streams which are included in at least one output data stream;
(v) a second group of data components comprises, if the number of the second group of input data streams is not zero, data components of said second group of input data streams; and
(vi) a third group of data components comprises, if the number of the third group of input data streams is not zero, data components of said third group of input data streams;
the generating the at least one secondary continuous query based on the at least one primary continuous query comprises the execution of at least one process of:
(a) combining a value of the first group of data components which has not been filtered out with the second group of data components to generate a combination that is not used by any of the at least one primary continuous query;
(b) repeating the process (a) until all possible combinations have been generated;
(c) combining a value of the first group of data components which has been filtered out with the second group of data components to generate a combination that is not used by any of the at least one primary continuous query;
(d) repeating the process (c) until all possible combinations have been generated;
(e) combining a value of the first group of data components which has not been filtered out with the third group of data components to generate a combination that is not used by any of the at least one primary continuous query;

(f) repeating the process (e) until all possible combinations have been generated;

(g) combining a value of the first group of data components which have been filtered out with the third group of data components to generate a combination that is not used by any of the at least one primary continuous query; and (h) repeating the process (g) until all possible combinations have been generated.

8. The data stream management system of claim 7, wherein the processing circuitry is further configured to select, amongst the at least one secondary continuous query, at least one preferred secondary continuous query.

9. The data stream management system of claim 8, wherein the processing circuitry is further configured to execute a process that takes into account at least one of:
expected memory resources for execution, by the data stream management system, of the at least one secondary continuous query;
expected processing resources for execution, by the data stream management system, of the at least one secondary continuous query; and
likelihood that the at least one secondary continuous query is requested by the at least one external application.

10. The data stream management system of claim 7, wherein the processing circuitry is further configured to:
determine that more resources than available are required to execute, on the data stream management system, at least one continuous query newly requested by the at least one external application; and
interrupt the execution of the at least one secondary continuous query.

11. The data stream management system of claim 10, wherein the processing circuitry is further configured to resume the execution of the interrupted at least one secondary continuous query one of:
when determining that sufficient resources are available to execute, on the data stream management system, the at least one secondary continuous query; and
when receiving, from the at least one external application, a request to execute on the data stream management system a continuous query that matches the interrupted at least one secondary continuous query.

12. The data stream management system of claim 7, wherein the processing circuitry is further configured such that the generating the at least one secondary continuous query based on the at least one primary continuous query comprises carrying out, successively, the execution of processes (a), (b), (c), (d), (e), (f), (g) and (h).

13. A non-transitory computer readable medium comprising computer-executable instructions executable by a processor of a data stream management system (DSMS) in communication with at least one external application registering ad-hoc continuous queries with the DSMS, the data stream management system being suitable for executing continuous queries on input data streams, and, at least one continuous query, here referred to as the at least one primary continuous query, is one of executed by and provisioned to be executed by, the data stream management system on at least one input data stream to produce at least one output data stream, when the computer-executable instructions are executed by the processor of the data stream management system, processor of the data stream management system is caused to:
generate at least one additional continuous query as at least one secondary continuous query by predicting which ad-hoc continuous query will be requested by the at least one external application before the ad-hoc continuous query is requested by the at least one external application;
execute the at least one secondary continuous query on the data stream management system on at least one input data stream in anticipation of receipt of a request to execute a requested ad-hoc continuous query matching the at least one secondary continuous query before the requested ad-hoc continuous query is received;
store an output data stream generated by execution of the at least one secondary continuous query;
after executing the at least one secondary continuous query and after storing the output data stream generated by the execution:
receive, from the at least one external application, a request to register an ad-hoc continuous query; and
determine that the received request to register the ad-hoc continuous query matches the executed at least one secondary continuous query; and
as a result of determining that the received request to register the ad-hoc continuous query matches the executed at least one secondary continuous query, transmitting the stored output data stream generated by the execution of the at least one secondary continuous query to satisfy the request to register the ad-hoc continuous query;
each one of the at least one generated secondary continuous query being different from each one of the at least one primary continuous query; and
the generation of the at least one secondary continuous query based on the at least one primary continuous query and in the generation of the at least one secondary continuous query:
(i) a first group of input data streams comprises the input data streams of which at least some data is used in a filtering condition in the at least one primary continuous query;
(ii) a second group of input data streams comprises the input data streams of which no data is used in a filtering condition in the at least one primary continuous query but of which at least some data is used in the at least one primary continuous query;
(iii) a third group of input data streams comprises the input data streams of which no data is used in the at least one primary continuous query;
(iv) a first group of data components comprises the data components of the first group of input data streams which are used in a filtering condition and the data components of said first group of input data streams which are included in at least one output data stream;
(v) a second group of data components comprises, if the number of the second group of input data streams is not zero, data components of said second group of input data streams; and
(vi) a third group of data components comprises, if the number of third group of input data streams is not zero, data components of said third group of input data streams;
the generating the at least one secondary continuous query based on the at least one primary continuous query comprises at least one of:
(a) combining a value of the first group of data components which has not been filtered out with the second group of data components to generate a combination that is not used by any of the at least one primary continuous query;

(b) repeating step (a) until all possible combinations have been generated;
(c) combining a value of the first group of data components which has been filtered out with the second group of data components to generate a combination that is not used by any of the at least one primary continuous query;
(d) repeating step (c) until all possible combinations have been generated;
(e) combining a value of the first group of data components which has not been filtered out with the third group of data components to generate a combination that is not used by any of the at least one primary continuous query;
(f) repeating step (e) until all possible combinations have been generated;
(g) combining a value of the first group of data components which has been filtered out with the third group of data components to generate a combination that is not used by any of the at least one primary continuous query; and
(h) repeating step (g) until all possible combinations have been generated.

\* \* \* \* \*